US009132638B2

(12) United States Patent
Otsuka et al.

(10) Patent No.: US 9,132,638 B2
(45) Date of Patent: Sep. 15, 2015

(54) INKJET PRINTER

(75) Inventors: Tadakazu Otsuka, Hamamatsu (JP); Fumiyoshi Yoshizawa, Hamamatsu (JP)

(73) Assignee: ROLAND DG CORPORATION, Shizuoka-Ken (JP)

( * ) Notice: Subject to any disclaimer, the term of this patent is extended or adjusted under 35 U.S.C. 154(b) by 528 days.

(21) Appl. No.: 13/131,099

(22) PCT Filed: Nov. 27, 2009

(86) PCT No.: PCT/JP2009/069997
§ 371 (c)(1), (2), (4) Date: May 25, 2011

(87) PCT Pub. No.: WO2010/061904
PCT Pub. Date: Jun. 3, 2010

(65) Prior Publication Data

US 2011/0235069 A1 Sep. 29, 2011

(30) Foreign Application Priority Data

Nov. 28, 2008 (JP) ................................ 2008-303480

(51) Int. Cl.

| | |
|---|---|
| ***G06K 15/10*** | (2006.01) |
| ***B41J 2/15*** | (2006.01) |
| ***B41J 13/00*** | (2006.01) |
| *B41J 29/38* | (2006.01) |
| *B41J 2/045* | (2006.01) |
| *B41J 2/01* | (2006.01) |
| *B41J 11/00* | (2006.01) |

(52) U.S. Cl.
CPC ................ *B41J 2/15* (2013.01); *B41J 13/0045* (2013.01); *B41J 11/002* (2013.01)

(58) Field of Classification Search
None
See application file for complete search history.

(56) References Cited

U.S. PATENT DOCUMENTS

| | | | | |
|---|---|---|---|---|
| 6,834,948 | B2 * | 12/2004 | Asano et al. | 347/102 |
| 7,497,540 | B2 * | 3/2009 | Mizutani et al. | 347/15 |
| 7,738,125 | B2 * | 6/2010 | Izumikawa | 358/1.14 |
| 2006/0044331 | A1 | 3/2006 | Tsutsumi et al. | |

FOREIGN PATENT DOCUMENTS

| | | |
|---|---|---|
| JP | 2000-85114 A | 3/2000 |
| JP | 2000-301800 A | 10/2000 |

(Continued)

OTHER PUBLICATIONS

Japanese Office Action for related Japanese Application No. 2010-540514 dated Mar. 14, 2012, pp. 1-8.

(Continued)

*Primary Examiner* — Ashish K Thomas
*Assistant Examiner* — Neil R McLean
(74) *Attorney, Agent, or Firm* — Ditthavong & Steiner, P.C.

(57) ABSTRACT

An object is to shorten the printing time of an inkjet printer capable of forming a plurality of ink layers on a medium. An inkjet printer (100) includes an ink head unit (102) for ejecting ink toward a medium (M); a moving mechanism (130) for moving the ink head unit (102) in a left-right direction; a transfer mechanism (55) for transferring the medium (M) in a forward-rearward direction; and a control device (50). The control device (50) performs first printing of causing the ink head unit (102) to eject the ink while sequentially transferring the medium (M) forward and second printing of causing the ink head unit (102) to eject the ink while sequentially transferring the medium (M) rearward.

11 Claims, 43 Drawing Sheets

(56) References Cited

FOREIGN PATENT DOCUMENTS

| | | | | | |
|---|---|---|---|---|---|
| JP | 2000301800 | A | * | 10/2000 | ............... B41J 29/00 |
| JP | 2002-292907 | A | | 10/2002 | |
| JP | 2005-205670 | A | | 8/2005 | |
| JP | 2006-007427 | A | | 1/2006 | |
| JP | 2006-088609 | A | | 4/2006 | |
| JP | 2006-096022 | A | | 4/2006 | |
| JP | 2007-245511 | A | | 9/2007 | |

OTHER PUBLICATIONS

International Search Report, PCT/JP2009/069997, Dec. 22, 2009, pp. 74-79.

* cited by examiner

INKJET PRINTER

TECHNICAL FIELD

The present invention relates to an inkjet printer.

BACKGROUND ART

Conventionally, inkjet printers for ejecting ink toward a medium such as recording paper or the like to perform printing on the medium are known. Inkjet printers for stacking a plurality of inkjet layers on a surface of a medium to perform printing are also known (see, for example, Patent Document 1). In an inkjet printer disclosed in Patent Document 1, each time an ink head unit is moved in a left-right direction while ejecting ink, the medium is transferred forward by a prescribed distance. By repeating such an operation, one ink layer is formed on the entire surface of the medium. When the ink layer is formed, the medium is once returned rearward. Then, in a similar manner, the ink head unit is moved in the left-right direction while ejecting ink, and the medium is transferred forward sequentially. As a result, a new ink layer is formed on the above-formed ink layer.

CITATION LIST

Patent Literature

Patent document 1: Japanese Laid-Open Patent Publication No. 2005-205670

SUMMARY OF INVENTION

Technical Problem

The inkjet printer described above once returns the medium rearward after one ink layer is formed, and then forms another ink layer. Therefore, the printing time is extended by the time for returning the medium rearward.

The present invention made in light of such circumstances has an object of shortening the printing time of an inkjet printer capable of forming a plurality of ink layers on a medium.

Solution to Problem

An inkjet printer according to the present invention includes an ink head unit for ejecting ink toward a medium; a moving mechanism for moving the ink head unit in a left-right direction; a transfer mechanism for transferring the medium in a forward-rearward direction; and a control device for controlling the ink head unit, the moving mechanism, and the transfer mechanism. The control device performs first printing of causing the ink head unit to eject the ink while sequentially transferring the medium forward and second printing of causing the ink head unit to eject the ink while sequentially transferring the medium rearward.

Advantageous Effects of the Invention

According to the present invention, the printing time of an inkjet printer capable of forming a plurality of ink layers on a medium can be shortened.

DESCRIPTION OF EMBODIMENTS

In this specification, the term "medium" encompasses various types of recording mediums formed of paper such as plain paper and the like and also recording mediums formed of various materials including resin materials such as PVC, polyester and the like, aluminum, iron, wood and the like.

In this specification, the term "inkjet system" refers to any printing system performed by inkjet technologies using various conventionally known techniques including various types of continuous systems such as a binary deflection system, a continuous deflection system and the like, and also various types of on-demand systems such as a thermal system, a piezoelectric element system and the like.

<Structure of an Inkjet Printer>

First, a structure of an inkjet printer 100 will be described. The inkjet printer 100 uses, for example, recording paper M as a medium. The inkjet printer 100 uses ink which is cured when being irradiated with ultraviolet (hereinafter, referred to as the "UV ink" when appropriate).

Figure 1:
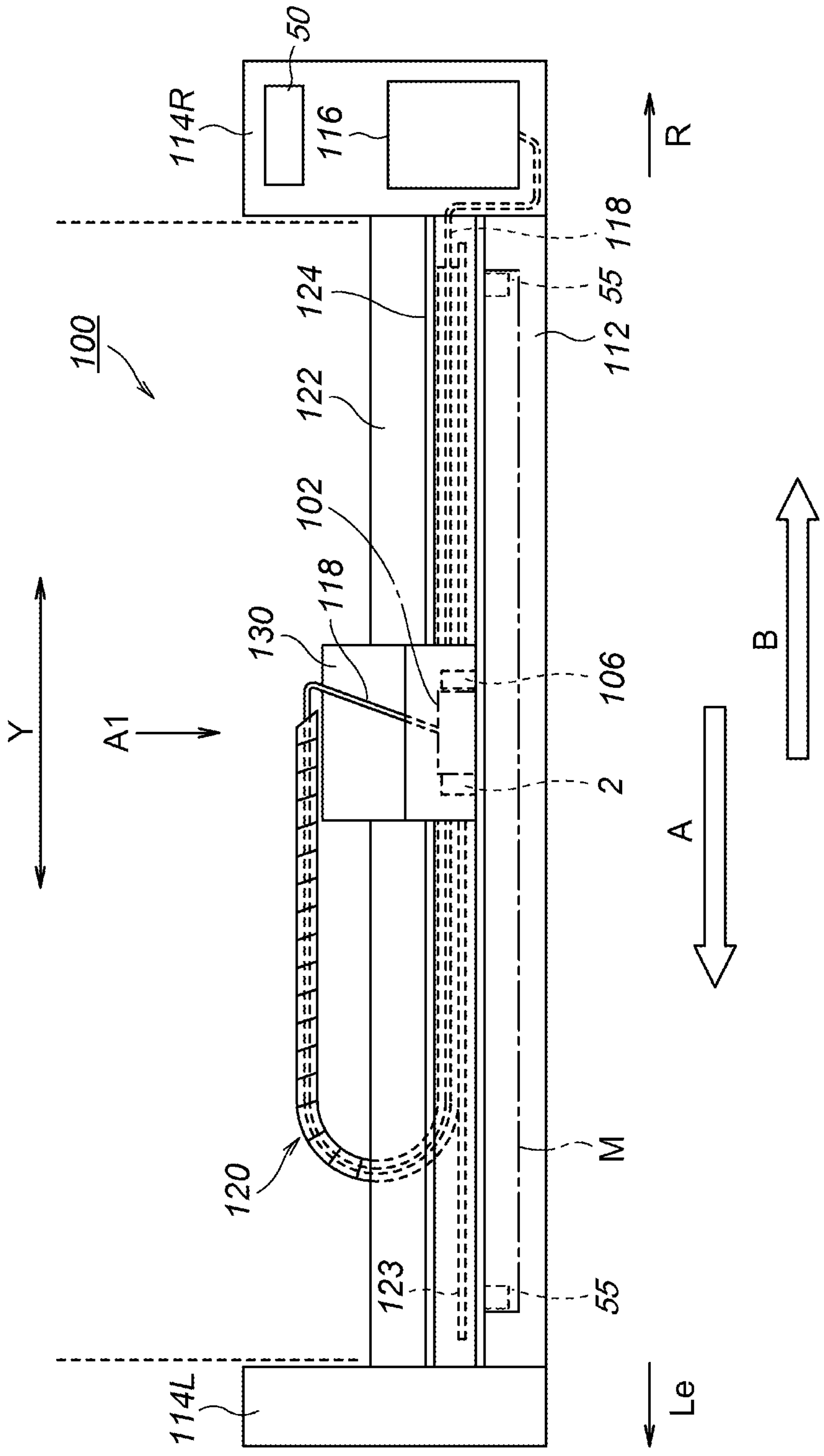
FIG. 1 is a front view of an important part of an inkjet printer.

The inkjet printer 100 includes a base member 112 extending in a left-right direction. At both of a left end and a right end of the base member 112, side members 114L and 114R are respectively provided. The side member 114L and the side member 114R are coupled to each other by a central wall 122. In the side member 114R, a plurality of ink cartridges 116 respectively storing various types of UV ink are located. In FIG. 1, only one ink cartridge 116 is shown.

The ink cartridge 116 is connected to one end of an ink tube 118. The other end of the ink tube 118 is connected to an ink head 103 described later (see FIG. 2). As described in detail later, one ink head 103 is provided for each of the various types of UV ink. An ink head unit 102 includes the plurality of ink heads 103. The UV ink stored in the ink cartridge 116 is supplied to the ink head 103 via the ink tube 118. In FIG. 1, only one ink tube 118 is shown. The ink tube 118 is inserted through, and is supported by, an ink tube guide 120.

On a surface of the central wall 122, a guide receiving member 123 is provided. The ink tube guide 120 is supported by the guide receiving member 123. On the surface of the central wall 122, a wire 124 movable in the left-right direction is provided. A carriage 130 is fixed to the wire 124. As the wire 124 is moved, the carriage 130 is moved in the left-right direction. In the following description, the moving direction of the carriage will be referred to as the "main scanning direction Y".

The ink head unit 102 is mounted on the carriage 130. On the carriage 130, two ultraviolet lamps 2 and 106 each formed of an LED (Light Emitting Diode) lamp are mounted as irradiation devices for outputting ultraviolet. The ultraviolet lamps 2 and 106 will be described later in detail. The ultraviolet lamps 2 and 106 shown in FIG. 1 are irradiation devices in Example 1 of Embodiment 1 described later, and are merely examples of irradiation device according to the present invention. The ink head 102, the ultraviolet lamps 2, and the ultraviolet lamps 106 are structured to reciprocate in the main scanning direction Y.

The inkjet printer 100 includes a grid roller 55 as a roller for transferring the recording paper M in a forward-rearward direction. Along the main scanning direction Y, a plurality of grid rollers 55 are provided. In FIG. 1, only the leftmost and rightmost grid rollers 55 are shown. Although not shown, a pinch roller is provided above each grid roller 55 so that the recording paper M is pinched between the pinch roller and the grid roller 55. In the following description, the transfer direction of the recording paper M will be referred to as the "sub scanning direction X".

The inkjet printer 100 includes a control device 50 formed of a microcomputer. The control device 50 controls various operations of the inkjet printer 100. More specifically, the control device 50 controls the movement of the carriage 130, the transfer of the recording paper M by the grid rollers 55, an operation of turning on or off the ultraviolet lamps 2 and 106, the ejection of the ink by the ink head unit 102, and the like.

Hereinafter, a plurality of examples will be described. These examples are different from one another in the form of the ink head unit and the irradiation devices.

(1) Embodiment 1

Figure 2:
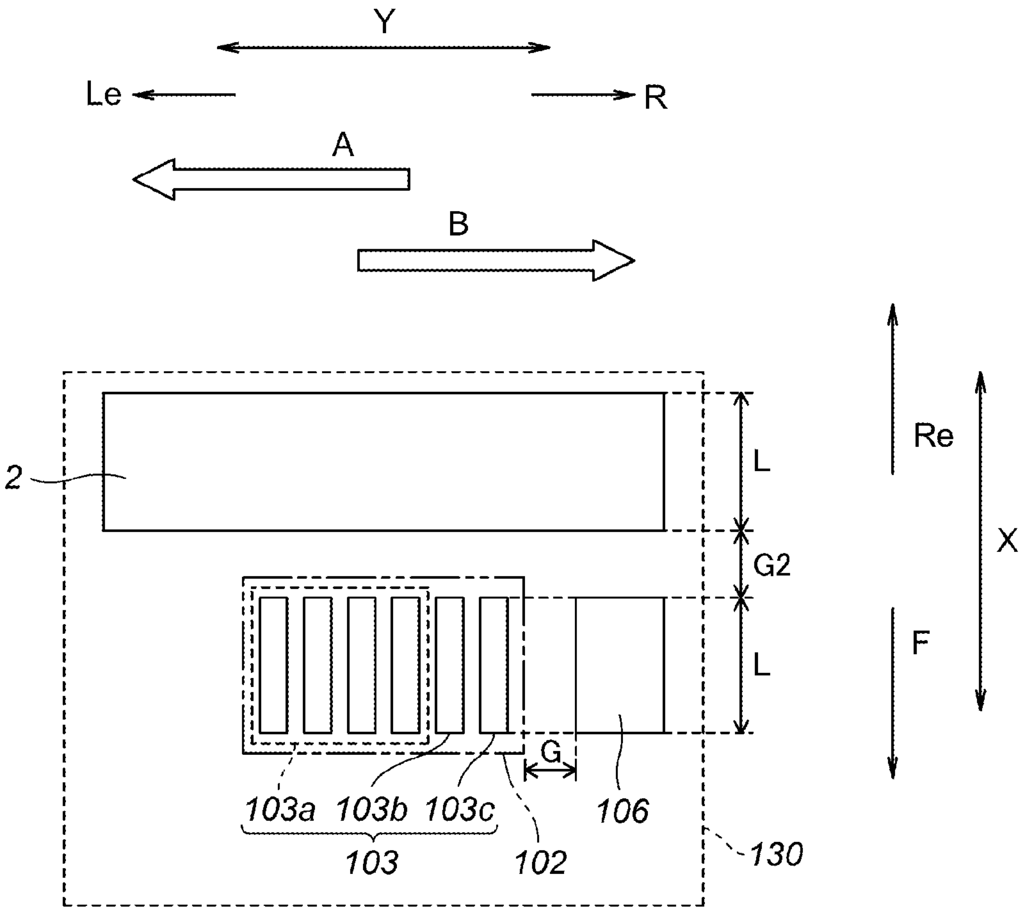
FIG. 2 shows an arrangement of an ink head unit and ultraviolet lamps in Example 1 of Embodiment 1.

As shown in FIG. 2, the ink head unit 102 includes an ink head 103*a* for ejecting process color ink, an ink head 103*b* for ejecting clear (transparent) ink, and an ink head 103*c* for ejecting white ink. Such ink is UV ink. Hereinafter, the ink heads 103*a*, 103*b* and 103*c* will be referred to as the "process color ink head", "clear ink head" and "white ink head" respectively, when appropriate.

In more detail, the process color ink head 103*a* includes an ink head for ejecting blue (cyan) ink, an ink head for ejecting red (magenta) ink, an ink head for ejecting yellow ink, and an ink head for ejecting black ink. Hereinafter, the ink heads for ejecting the blue, red, yellow and black ink will be referred to as the "blue ink head", "red ink head", "yellow ink head", and "black ink head" respectively, when appropriate.

In FIG. 2 and other figures, "F", "Re", "Le" and "R" respectively represent "forward", "rearward", "leftward" and "rightward", respectively. "A" and "B" represent an outgoing direction and a return direction of the carriage, respectively. Herein, the outgoing direction A is the leftward direction and the return direction B is the rightward direction, but these directions may be opposite. Printing by which ink is ejected only in the outgoing direction A is uni-direction printing. Printing by which ink is ejected in both of the outgoing direction A and the return direction B is bi-direction printing.

(1-1) Example 1

FIG. 2 is directed to Example 1 of Embodiment 1, and shows an arrangement of the ink head unit 102 and the like as seen in the A1 direction in FIG. 1. In Example 1, the process color ink head 103*a*, the clear ink head 103*b* and the white ink head 103*c* are located as being aligned in the forward-rearward direction. Rightward to the ink head unit 102, the ultraviolet lamp 106 is located. Rearward to the ink head unit 102 and the ultraviolet lamp 106, the ultraviolet lamp 2 is located. In FIG. 2 and other figures, the rectangular areas of the ink heads 103*a*, 103*b* and 103*c* drawn with the solid line represent respective ejection areas of the ink. The rectangular areas of the ultraviolet lamps 2 and 106 drawn with the solid line represent respective irradiation areas of ultraviolet. Reference sign L represents the length of the irradiation areas of the ultraviolet lamps 2 and 106 in the forward-rearward direction. A gap between the ink head unit 102 and the ultraviolet lamp 106 in the left-right direction is length G. The ejection areas of the ink heads 103*a*, 103*b* and 103*c* and the irradiation area of the ultraviolet lamp 106 have the same length in the forward-rearward direction. A gap between the ink head unit 102 and the ultraviolet lamp 2 in the forward-rearward direction is length G2. In the examples of this and other embodiments described later, G2 may be zero. In this example, the ultraviolet lamp 2 located rearward to the ink head unit 102 is longer in the left-right direction than the ultraviolet lamp 106 located to the side of the ink head unit 102. However, in the examples of this and other embodiments described later, the length in the left-right direction of the ultraviolet lamp located rearward to the ink head unit may be equal to, or shorter than, the length in the left-right direction of the ultraviolet lamp 106 located to the side of the ink head unit.

The inkjet printer 100 can perform first printing of ejecting the ink from the ink head unit while sequentially transferring the recording paper forward, and second printing of ejecting the ink from the ink head unit while sequentially transferring the recording paper rearward. In the first printing, the process color ink head 103*a* and the white ink head 103*c* eject the ink, but the clear ink head 103*b* does not eject the ink. In the second printing, neither the process color ink head 103*a* nor the white ink head 103*c* eject the ink, but the clear ink head 103*b* ejects the ink. In the first printing, the ultraviolet lamp located to the side of the ink head unit is lit up constantly or when necessary. Owing to this, the process color ink and the white ink on the recording paper are irradiated with ultraviolet, and cured.

Figure 3:
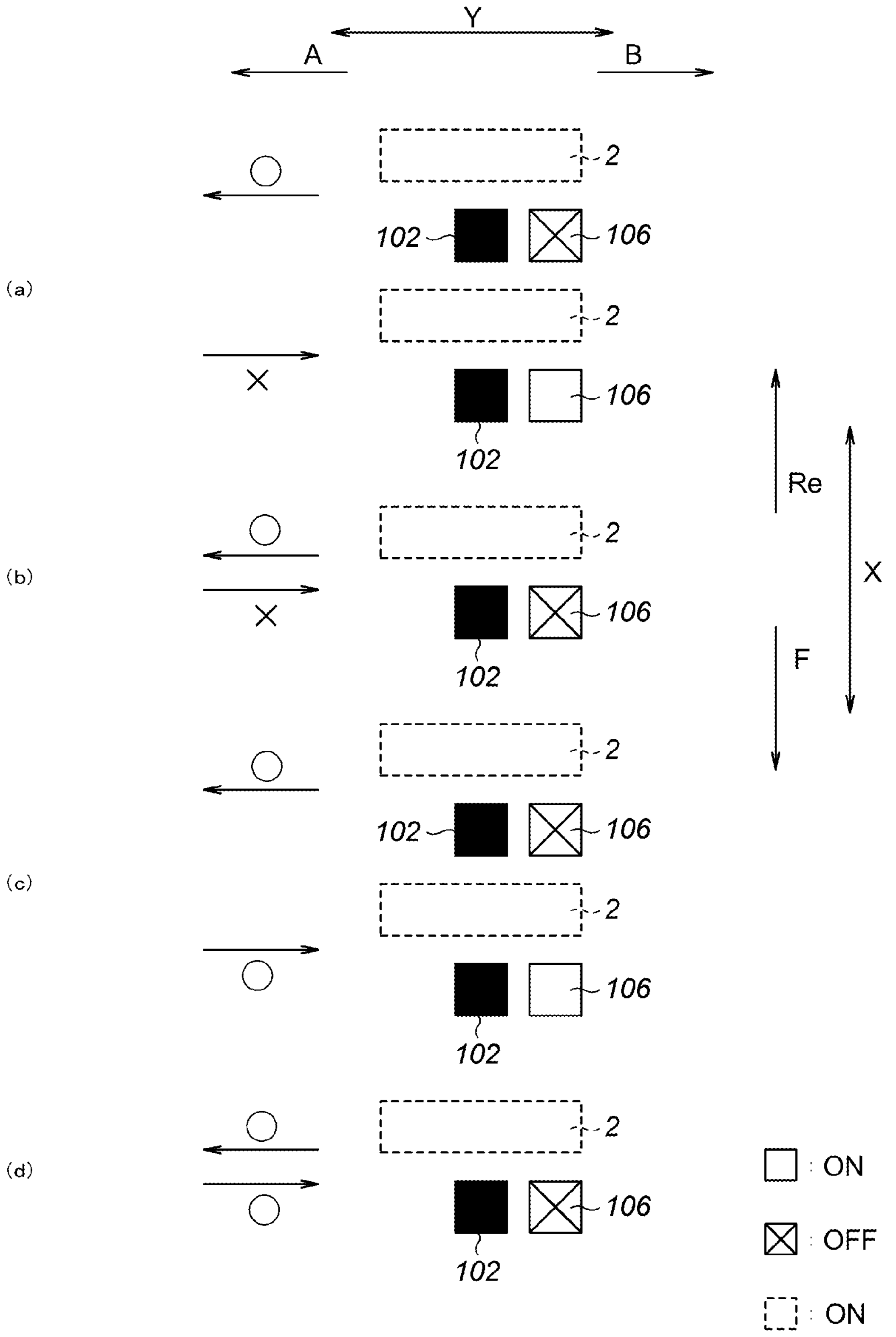
FIGS. 3(*a*) through (*d*) illustrate printing methods in Example 1 of Embodiment 1.

Now, an operation of the ink head unit 102 and the ultraviolet lamps 2 and 106 in the second printing will be described. The ink head unit 102 and the ultraviolet lamps 2 and 106 may operate in various forms. FIGS. 3(*a*) through (*d*) show examples thereof. In each figure, "○" indicates that the ink head unit 102 (in more detail, the clear ink head 103*b*; this is also applicable to the examples below) ejects the ink (in more detail, the clear ink; this is also applicable to the examples below), and "X" indicates that the ink head unit 102 does not eject the ink.

As shown in FIG. 3(*a*), according to a first method, while the carriage 130 is moved in the outgoing direction A, the ultraviolet lamp 2 is lit up, the ultraviolet lamp 106 is lit out, and the ink head unit 102 ejects the ink. While the carriage 130 is moved in the return direction B, the ultraviolet lamp 2 is lit up, the ultraviolet lamp 106 is lit up, and the ink head unit 102 does not eject the ink.

According to the first method, the clear ink ejected onto the recording paper is not irradiated with ultraviolet immediately after being ejected, and has a prescribed time duration until being irradiated with ultraviolet. Owing to this, the surface state of the clear ink becomes smooth, and the clear ink is cured by the ultraviolet radiating from the ultraviolet lamp 106 in the smooth surface state. Therefore, the cured clear ink is glossy. As a result, a highly glossy printed object can be obtained. The clear ink may also be cured by the ultraviolet lamp 2.

Such printing with a high level of glossiness is called "gloss printing". By contrast, when the time duration after the ink is ejected until the ink is cured is short, the surface state of the ink becomes rugged, and a printed object with no glossiness can be obtained. Such printing with no glossiness is called "matte printing".

As shown in FIG. 3(*b*), according to a second method, while the carriage 130 is moved in the outgoing direction A, the ultraviolet lamp 2 is lit up, the ultraviolet lamp 106 is lit out, and the ink head unit 102 ejects the ink. While the carriage 130 is moved in the return direction B, the ultraviolet lamp 2 is lit up, the ultraviolet lamp 106 is lit out, and the ink head unit 102 does not eject the ink. According to the second method, a more glossy printed object can be obtained.

As shown in FIG. 3(*c*), according to a third method, while the carriage 130 is moved in the outgoing direction A, the ultraviolet lamp 2 is lit up, the ultraviolet lamp 106 is lit out, and the ink head unit 102 ejects the ink. While the carriage 130 is moved in the return direction B, the ultraviolet lamp 2 is lit up, the ultraviolet lamp 106 is lit up, and the ink head unit 102 ejects the ink.

As shown in FIG. 3(*d*), according to a fourth method, while the carriage 130 is moved in the outgoing direction A and also in the return direction B, the ultraviolet lamp 2 is lit up, the ultraviolet lamp 106 is lit out, and the ink head unit 102 ejects the ink.

(1-2) Example 2

Figure 4:
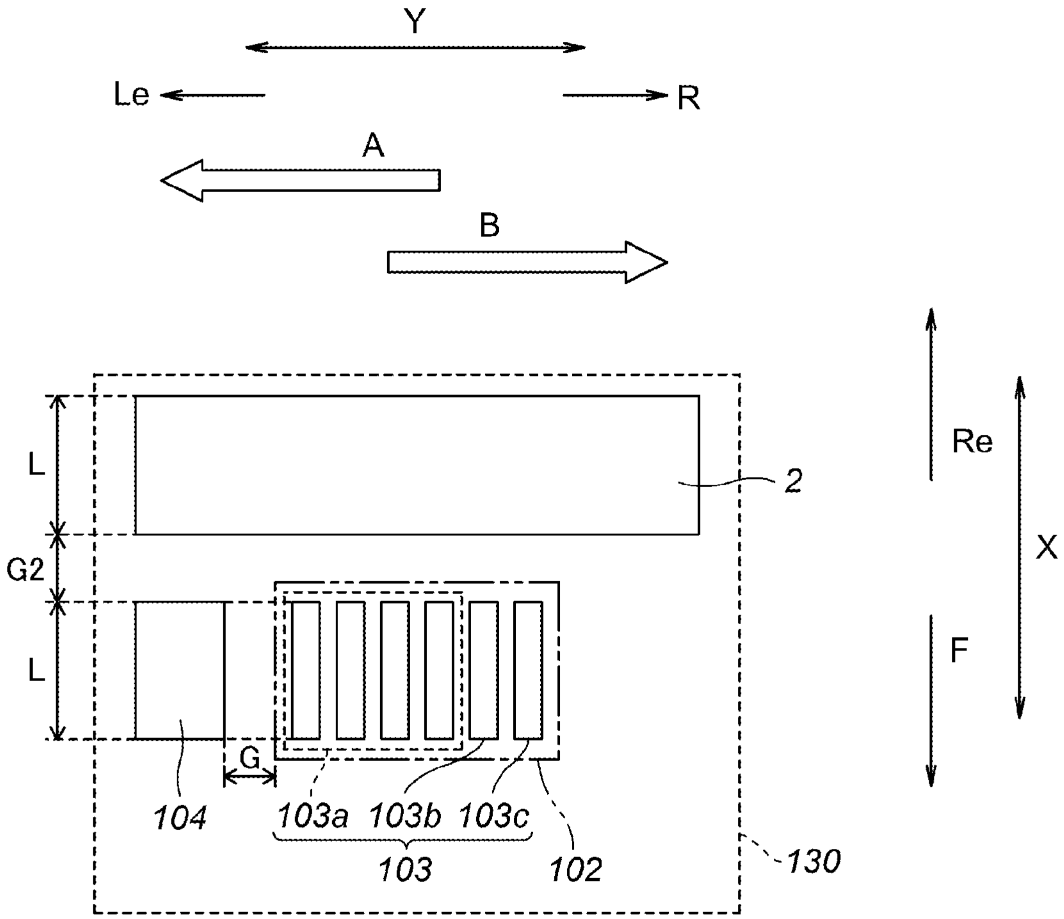
FIG. 4 shows an arrangement of an ink head unit and ultraviolet lamps in Example 2 of Embodiment 1.

As shown in FIG. 4, in Example 2, leftward to the ink head unit 102, an ultraviolet lamp 104 is located. Except for this, the structure is the same as in Example 1.

Figure 5:
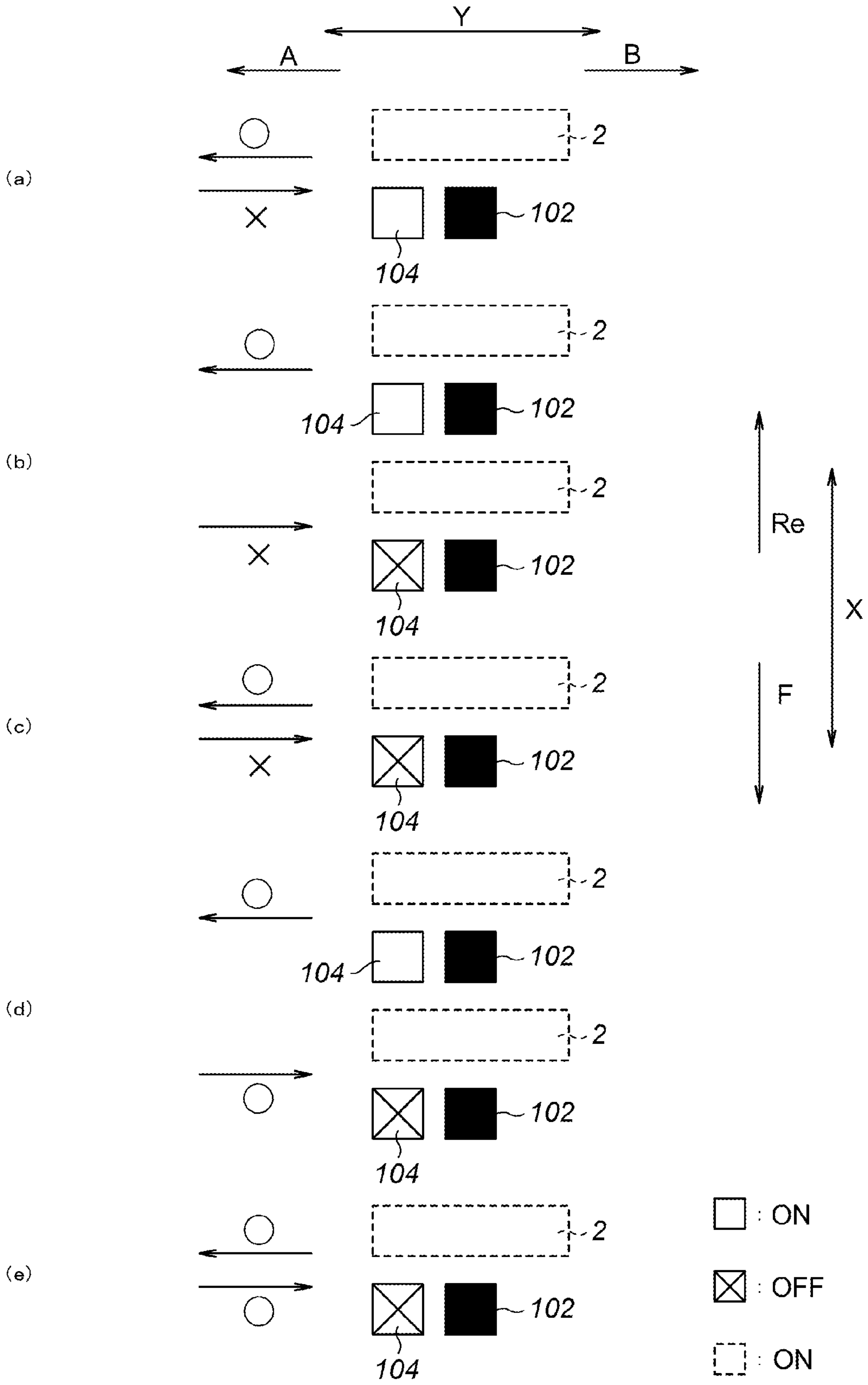
FIGS. 5(*a*) through (*e*) illustrate printing methods in Example 2 of Embodiment 1.

In Example 2, for the second printing, methods shown in, for example, FIGS. 5(*a*) through (*e*) may be used. The specifics of each method are clear from the figures, and will not be described.

(2) Embodiment 2

Figure 6:
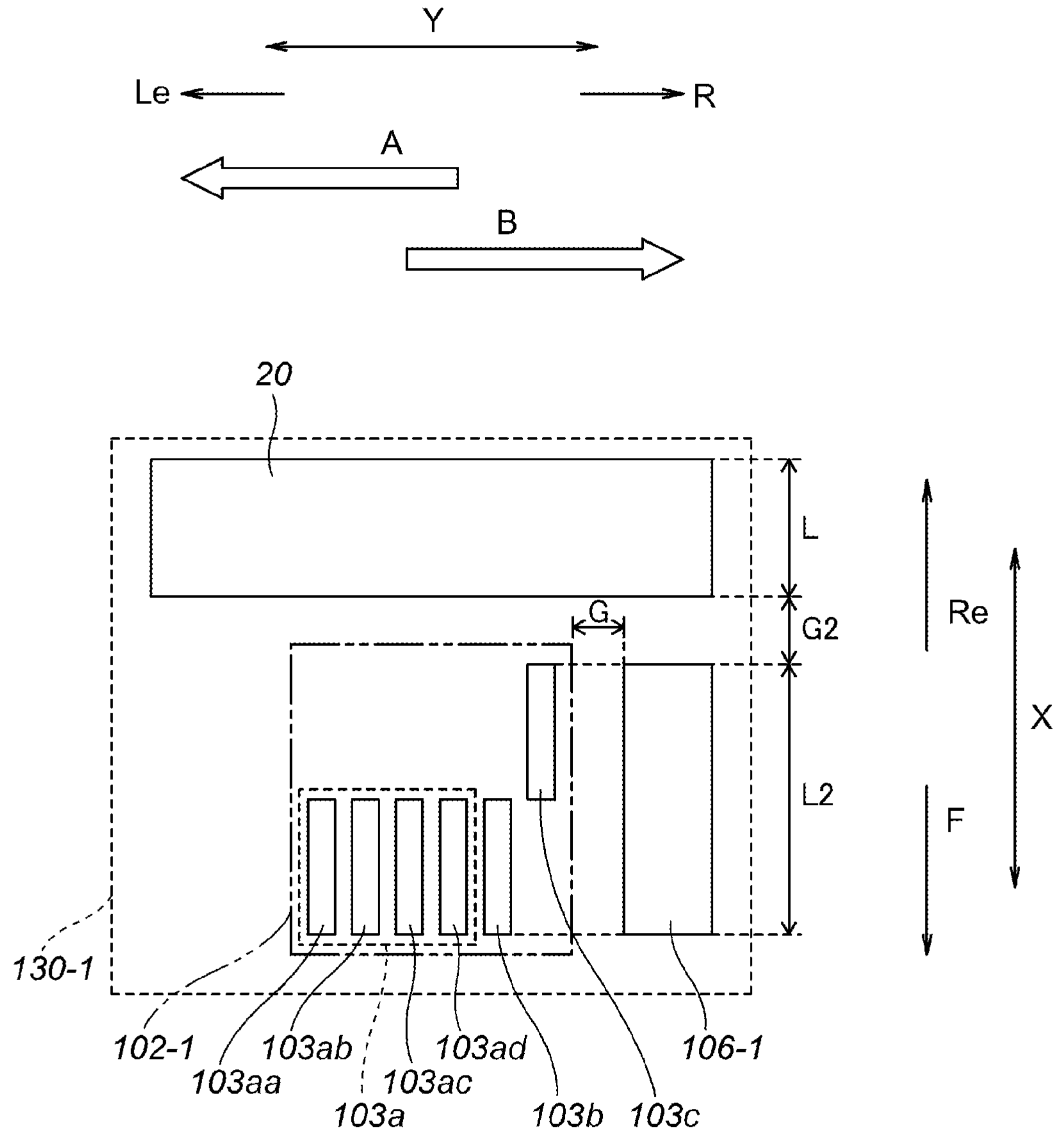
FIG. 6 shows an arrangement of an ink head unit and ultraviolet lamps in Example 1 of Embodiment 2.

As shown in FIG. 6, in Embodiment 2, the white ink head 103*c* is located rearward to a blue ink head 103*aa*, a red ink head 103*ab*, a yellow ink head 103*ac*, a black ink head 103*ad*, and the clear ink head 103*b*. In Embodiment 2 also, the first printing of ejecting the process color ink and the white ink from the ink head unit while sequentially transferring the recording paper forward, and the second printing of ejecting the clear ink from the ink head unit while sequentially transferring the recording paper rearward, are performed.

(2-1) Example 1

FIG. 6 shows an ink head unit 102-1 and the like in Example 1 of Embodiment 2. Reference sign L2 represents the length of the ejection area of the ink head unit 102-1 in the forward-rearward direction. Rightward to the ink head unit 102-1, an ultraviolet lamp 106-1 is located. A length of the irradiation area of the ultraviolet lamp 106-1 in the forward-rearward direction is L2. Rearward to the ink head unit 102-1 and the ultraviolet lamp 106-1, an ultraviolet lamp 20 is located. The ink head unit 102-1 and the ultraviolet lamps 20 and 106-1 are mounted on a carriage 130-1.

Figure 7:
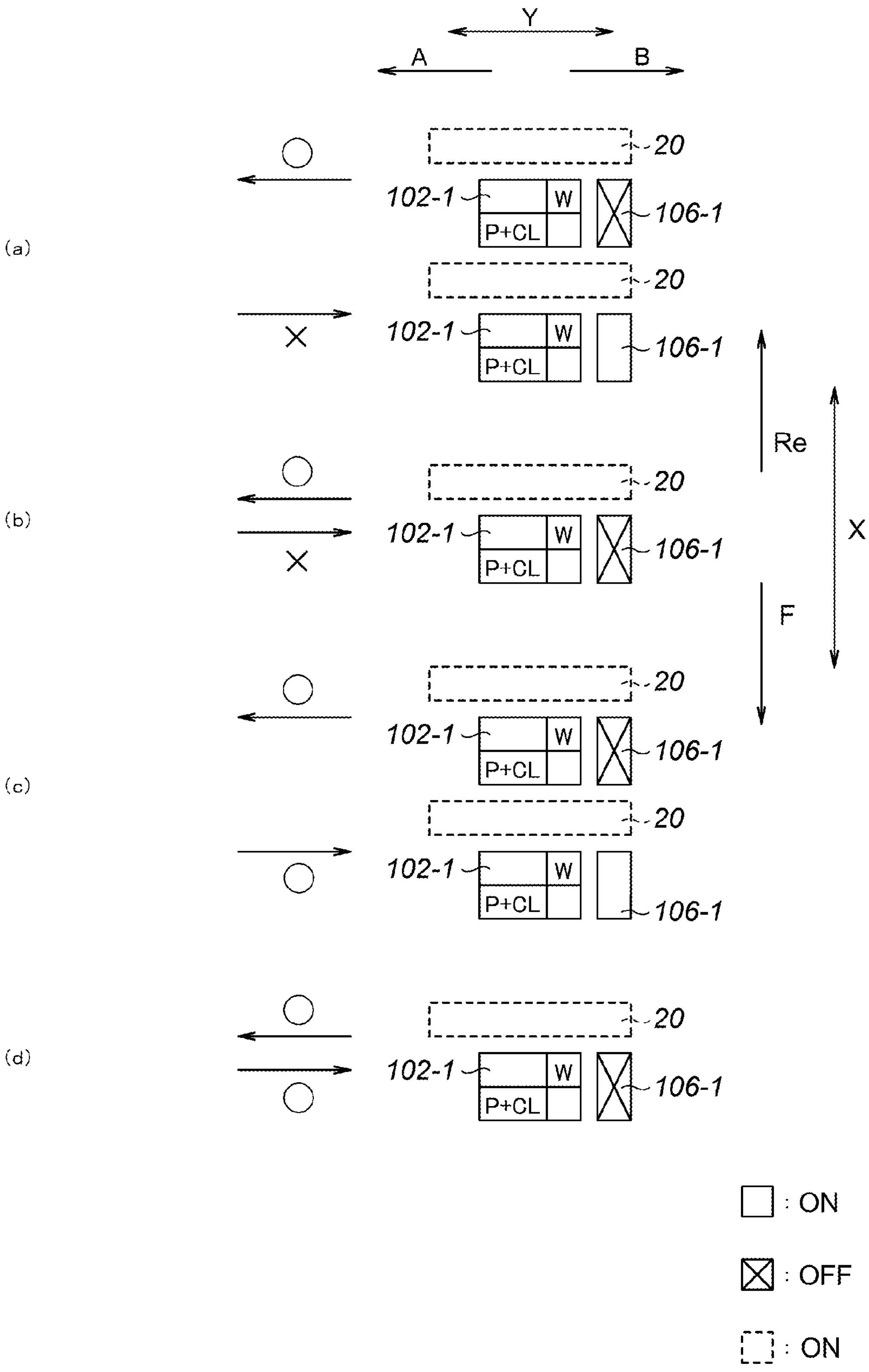
FIGS. 7(*a*) through (*d*) illustrate printing methods in Example 1 of Embodiment 2.

In Example 1, for the second printing, methods shown in, for example, FIGS. 7(*a*) through (*d*) may be used. In FIG. 7 and other figures, "W" represents the white ink head, "P" represents the process color ink head, and "CL" represents the clear ink head (this is also applicable to the examples below). The specifics of each method are clear from the figures, and will not be described.

(2-2) Example 2

Figure 8:
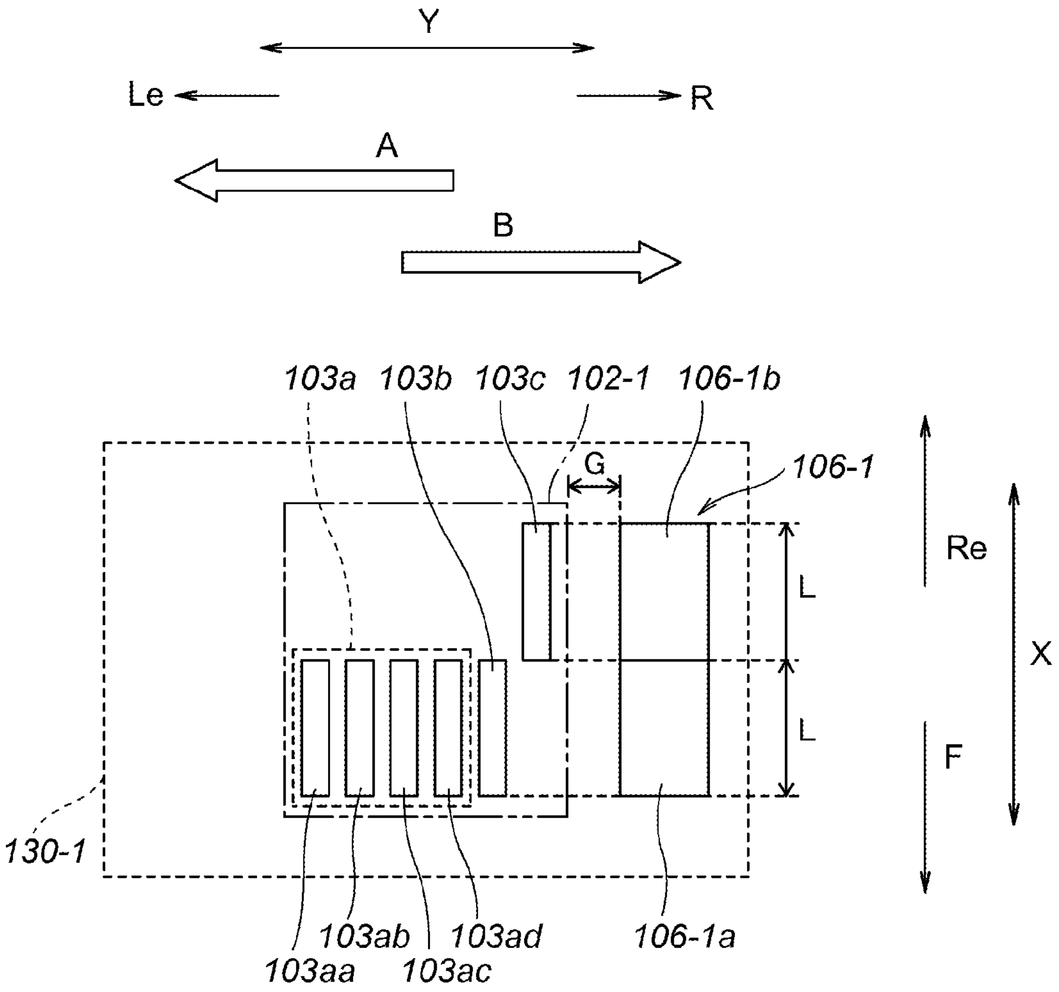
FIG. 8 shows an arrangement of an ink head unit and ultraviolet lamps in Example 2 of Embodiment 2.

As shown in FIG. 8, in Example 2, rightward to the process color ink head 103*a* and the clear ink head 103*b*, an ultraviolet lamp 106-1*a* is located, and rightward to the white ink head 103*c*, an ultraviolet lamp 106-1*b* is located.

Figure 9:
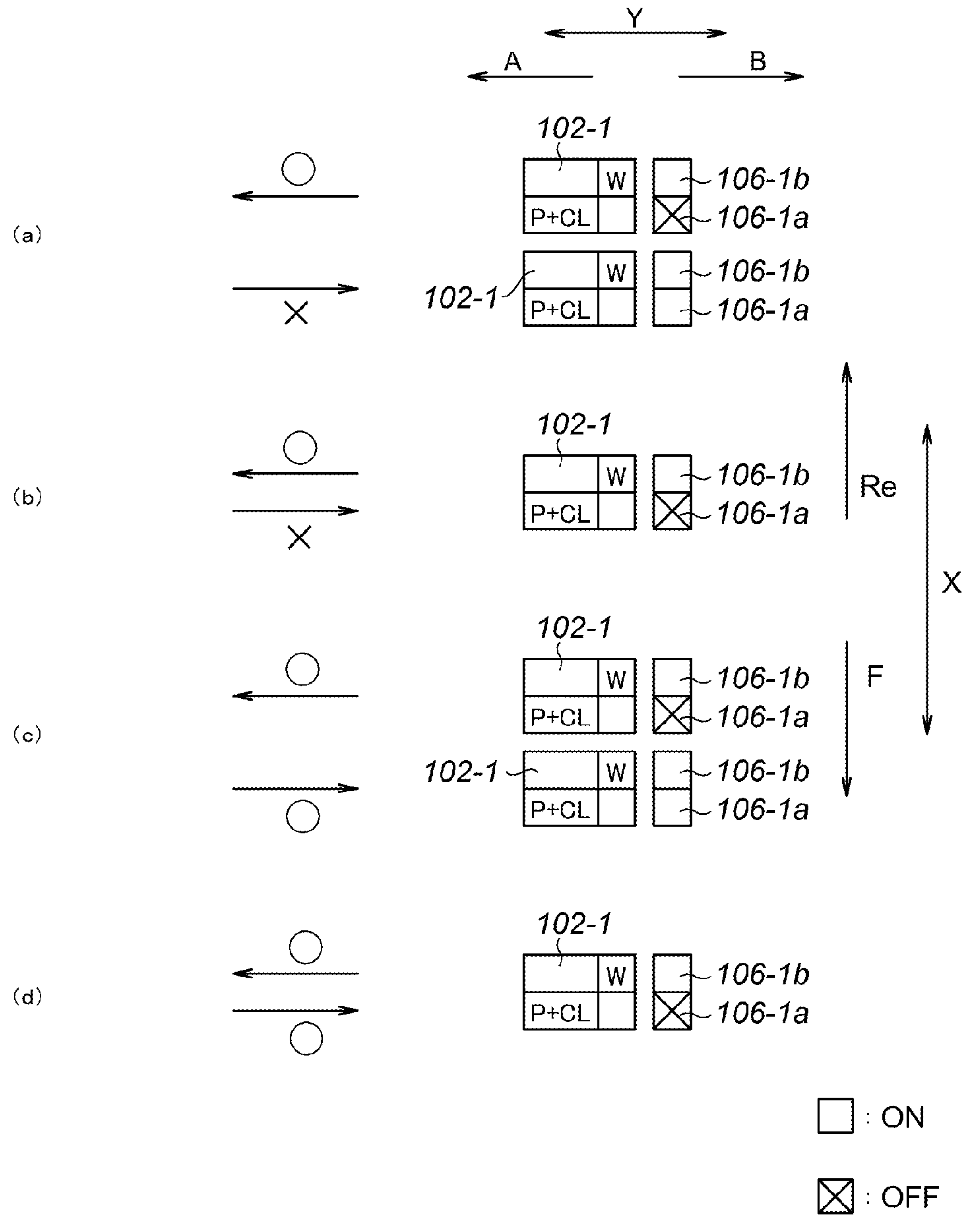
FIGS. 9(*a*) through (*d*) illustrate printing methods in Example 2 of Embodiment 2.

In Example 2, for the second printing, methods shown in, for example, FIGS. 9(*a*) through (*d*) may be used. The specifics of each method are clear from the figures, and will not be described.

(2-3) Example 3

Figure 10:
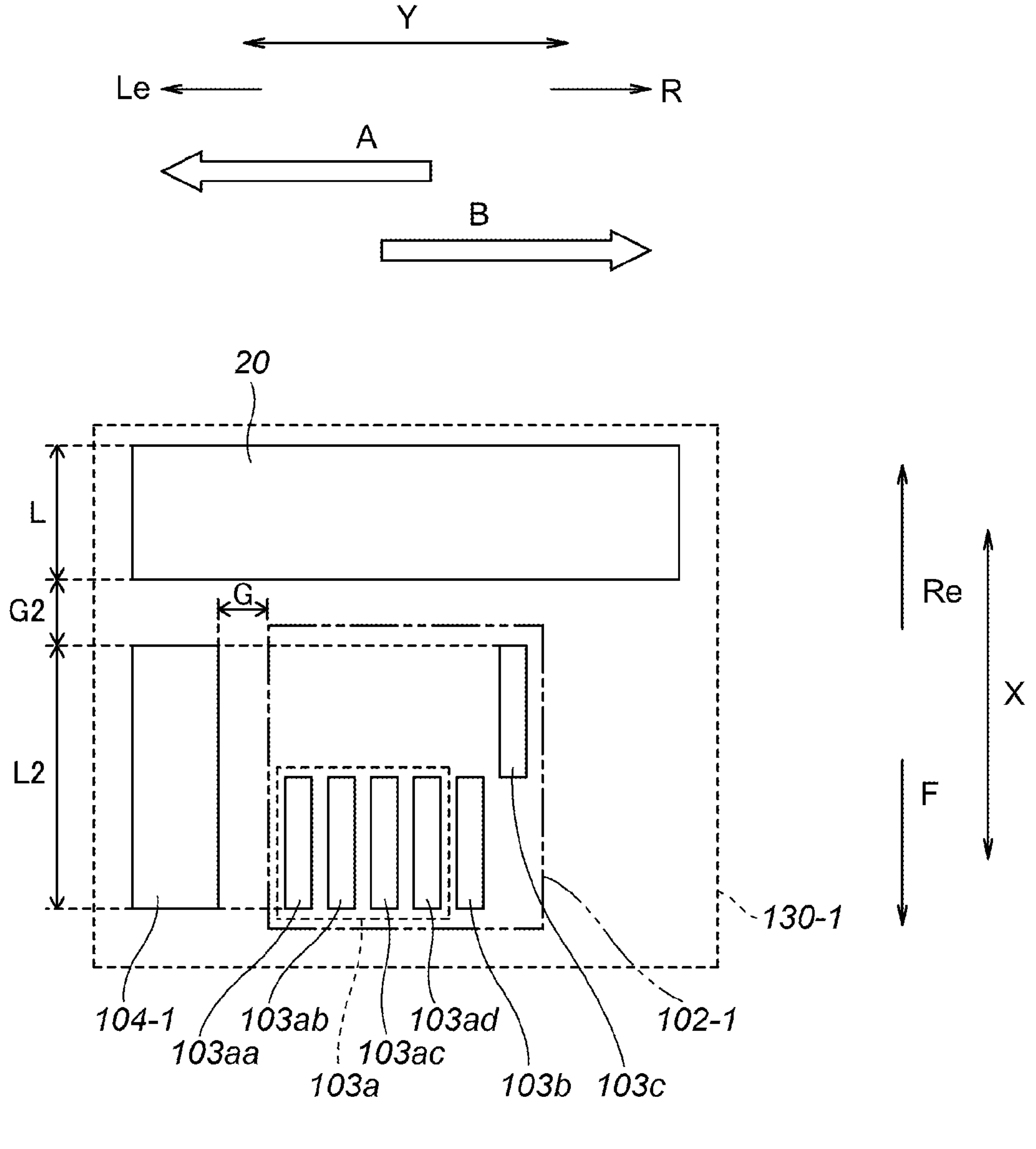
FIG. 10 shows an arrangement of an ink head unit and ultraviolet lamps in Example 3 of Embodiment 2.

As shown in FIG. 10, in Example 3, leftward to the ink head unit 102-1, an ultraviolet lamp 104-1 is located, and rearward to the ink head unit 102-1 and the ultraviolet lamp 104-1, the ultraviolet lamp 20 is provided.

Figure 11:
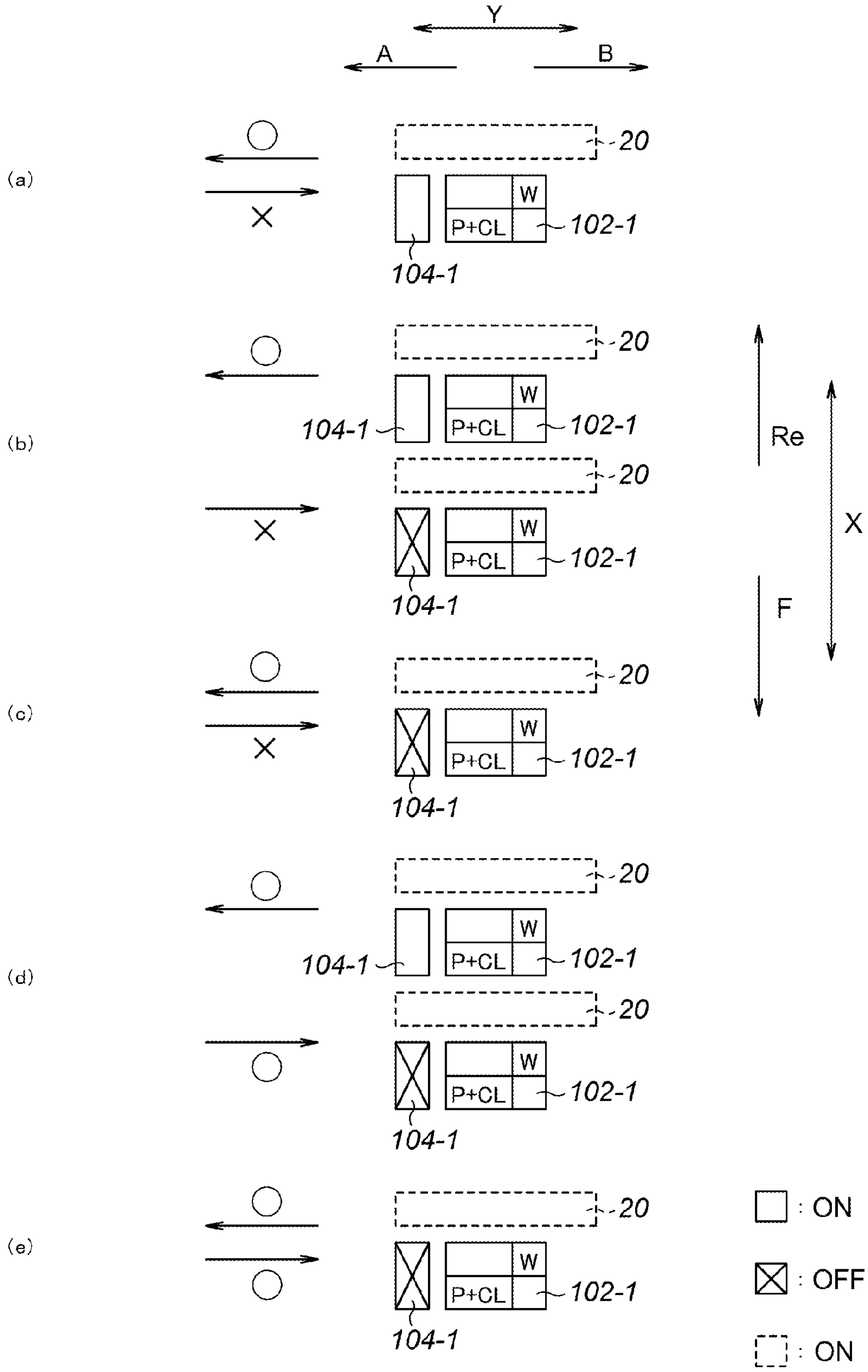
FIGS. 11(*a*) through (*e*) illustrate printing methods in Example 3 of Embodiment 2.

In Example 3, for the second printing, methods shown in, for example, FIGS. 11(*a*) through (*e*) may be used. The specifics of each method are clear from the figures, and will not be described.

(2-4) Example 4

Figure 12:
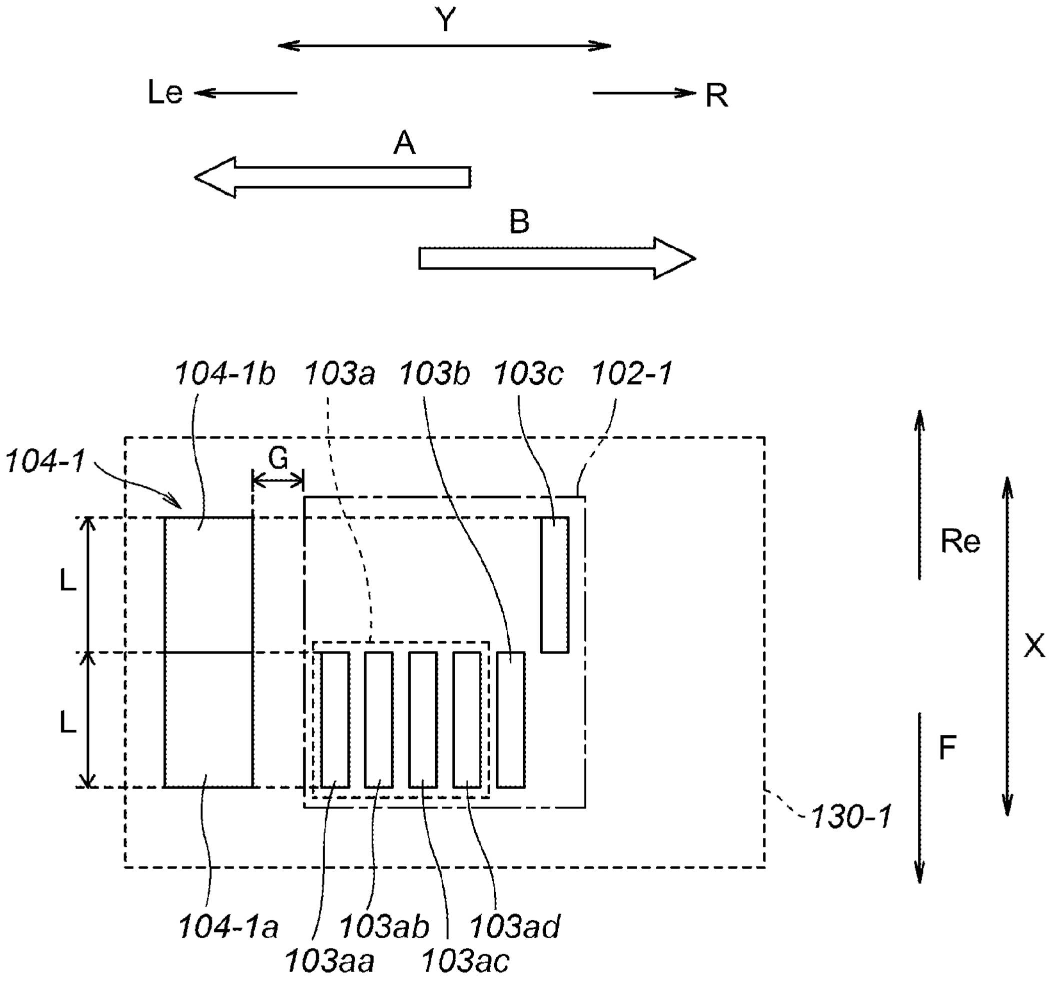
FIG. 12 shows an arrangement of an ink head unit and ultraviolet lamps in Example 4 of Embodiment 2.

As shown in FIG. 12, in Example 4, leftward to the process color ink head 103*a* and the clear ink head 103*b*, an ultraviolet lamp 104-1*a* is located, and leftward to the white ink head 103*c*, an ultraviolet lamp 104-1*b* is located.

Figure 13:
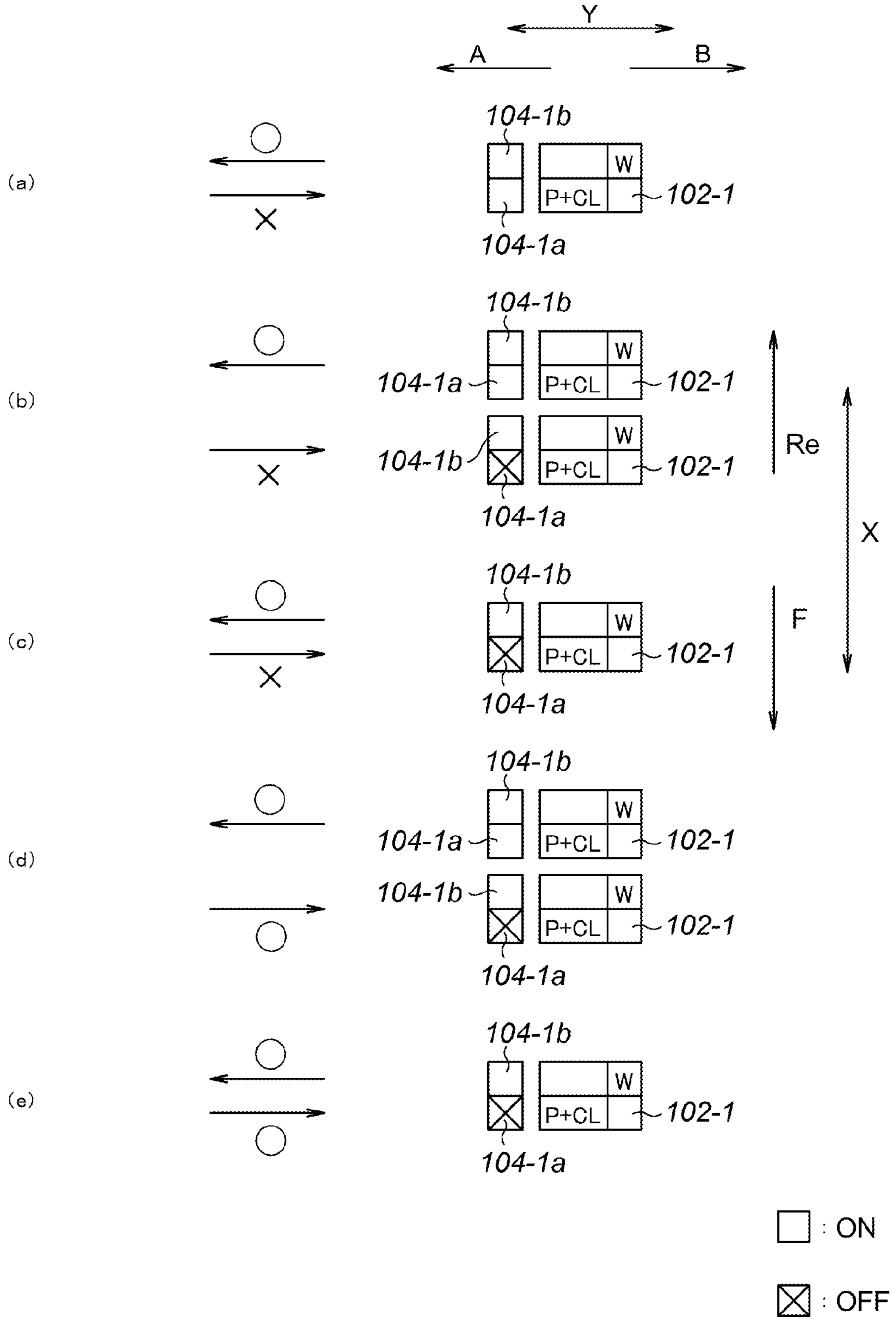
FIGS. 13(*a*) through (*e*) illustrate printing methods in Example 4 of Embodiment 2.

In Example 2, for the second printing, methods shown in, for example, FIGS. 13(*a*) through (*e*) may be used. The specifics of each method are clear from the figures, and will not be described.

(3) Embodiment 3

Figure 14:
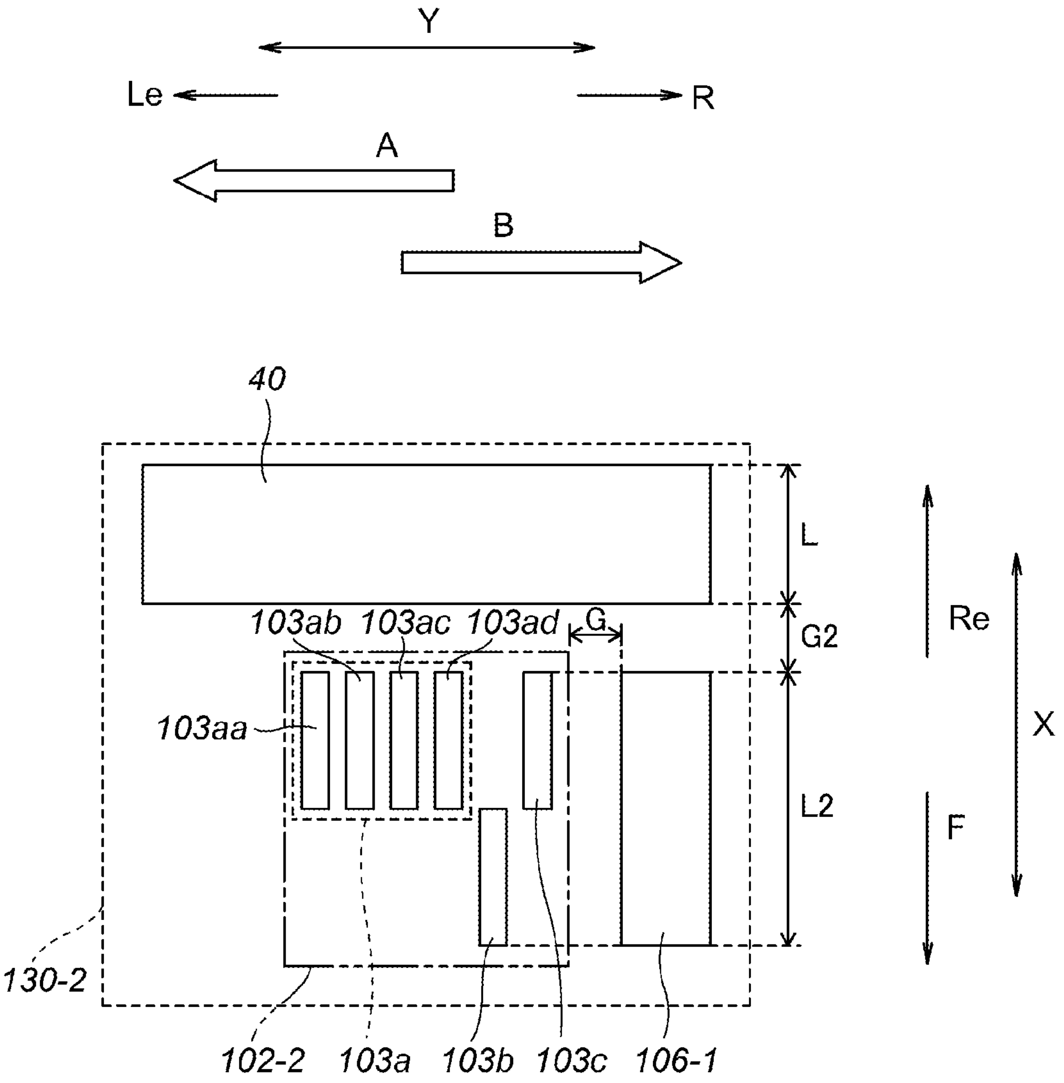
FIG. 14 shows an arrangement of an ink head unit and ultraviolet lamps in Example 1 of Embodiment 3.

As shown in FIG. 14, in Embodiment 3, the clear ink head 103*b* is located forward to the process color ink head 103*a* and the white ink head 103*c*. In Embodiment 3 also, the first printing of ejecting the process color ink and the white ink from an ink head unit 102-2 while sequentially transferring the recording paper forward, and the second printing of ejecting the clear ink from the ink head unit 102-2 while sequentially transferring the recording paper rearward, are performed.

(3-1) Example 1

FIG. 14 shows the ink head unit 102-2 and the like in Example 1 of Embodiment 3. Rightward to the ink head unit 102-2, the ultraviolet lamp 106-1 is located. Rearward to the ink head unit 102-2 and the ultraviolet lamp 106-1, an ultraviolet lamp 40 is located. The ink head unit 102-2, the ultraviolet lamps 40 and 106-1 are mounted on a carriage 130-2.

Figure 15:
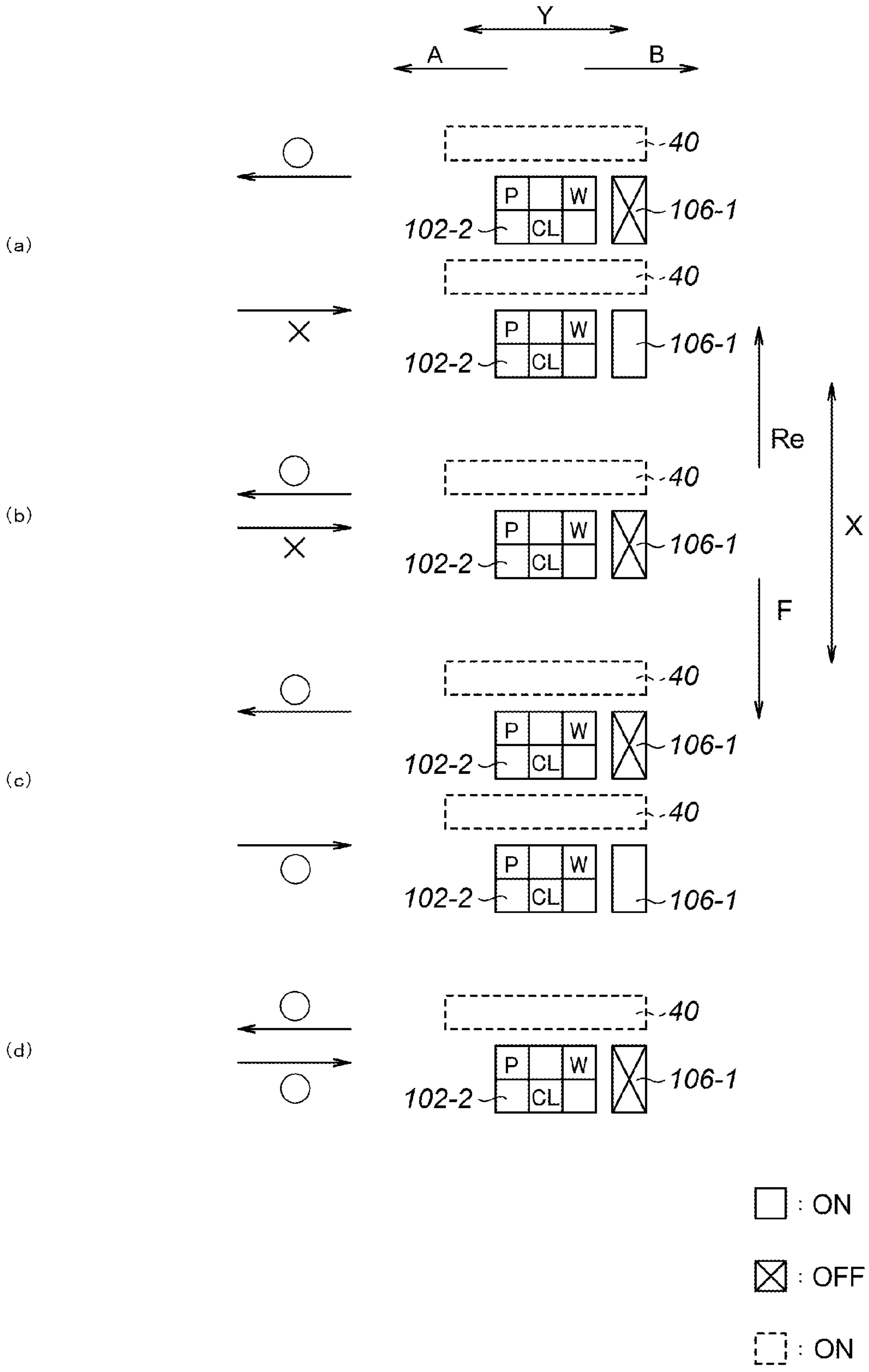
FIGS. 15(*a*) through (*d*) illustrate printing methods in Example 1 of Embodiment 3.

In Example 1, for the second printing, methods shown in, for example, FIGS. 15(*a*) through (*d*) may be used. The specifics of each method are clear from the figures, and will not be described.

(3-2) Example 2

Figure 16:
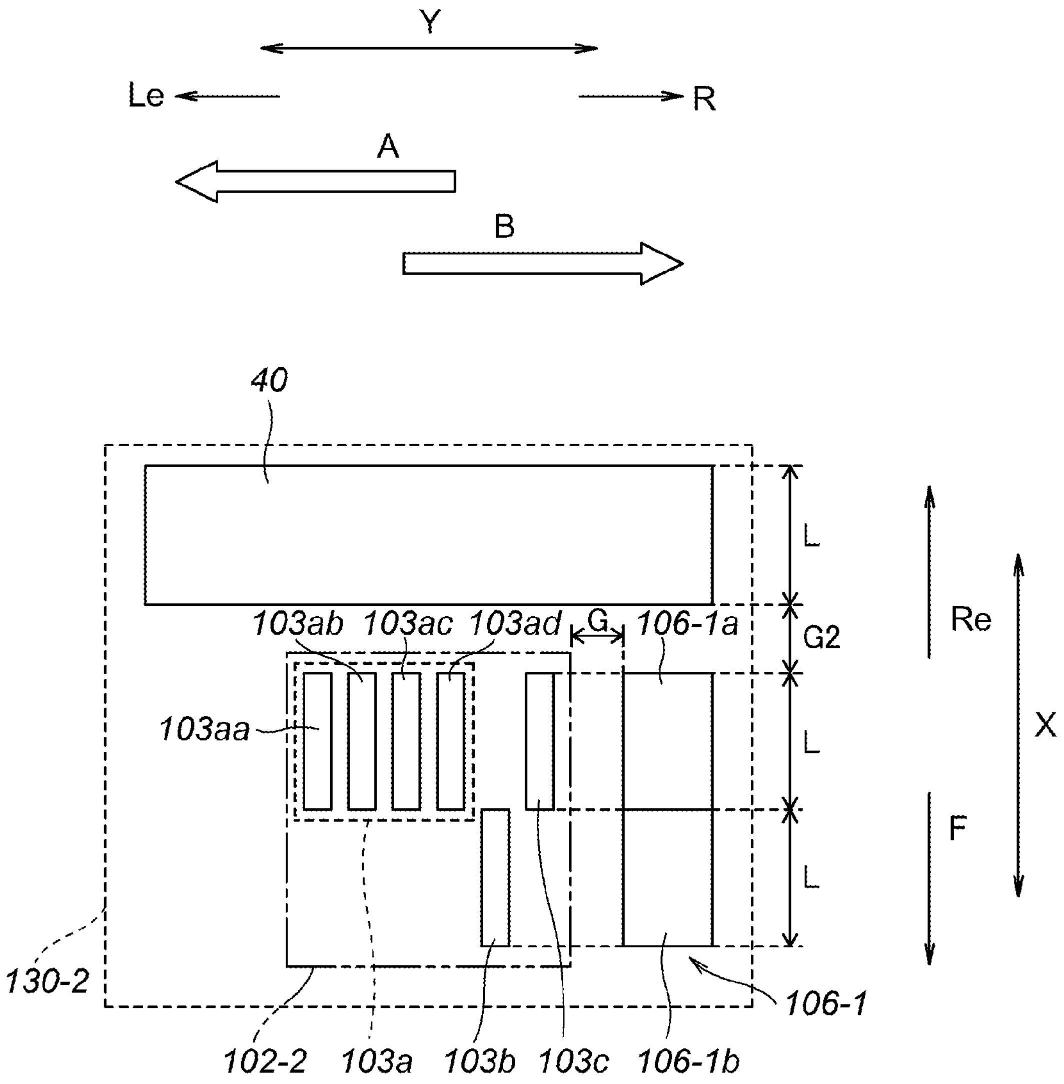
FIG. 16 shows an arrangement of an ink head unit and ultraviolet lamps in Example 2 of Embodiment 3.

As shown in FIG. 16, in Example 2, rightward to the process color ink head 103*a* and the white ink head 103*c*, the ultraviolet lamp 106-1*a* is located, and rightward to the clear ink head 103*b*, the ultraviolet lamp 106-1*b* is located.

Figure 17:
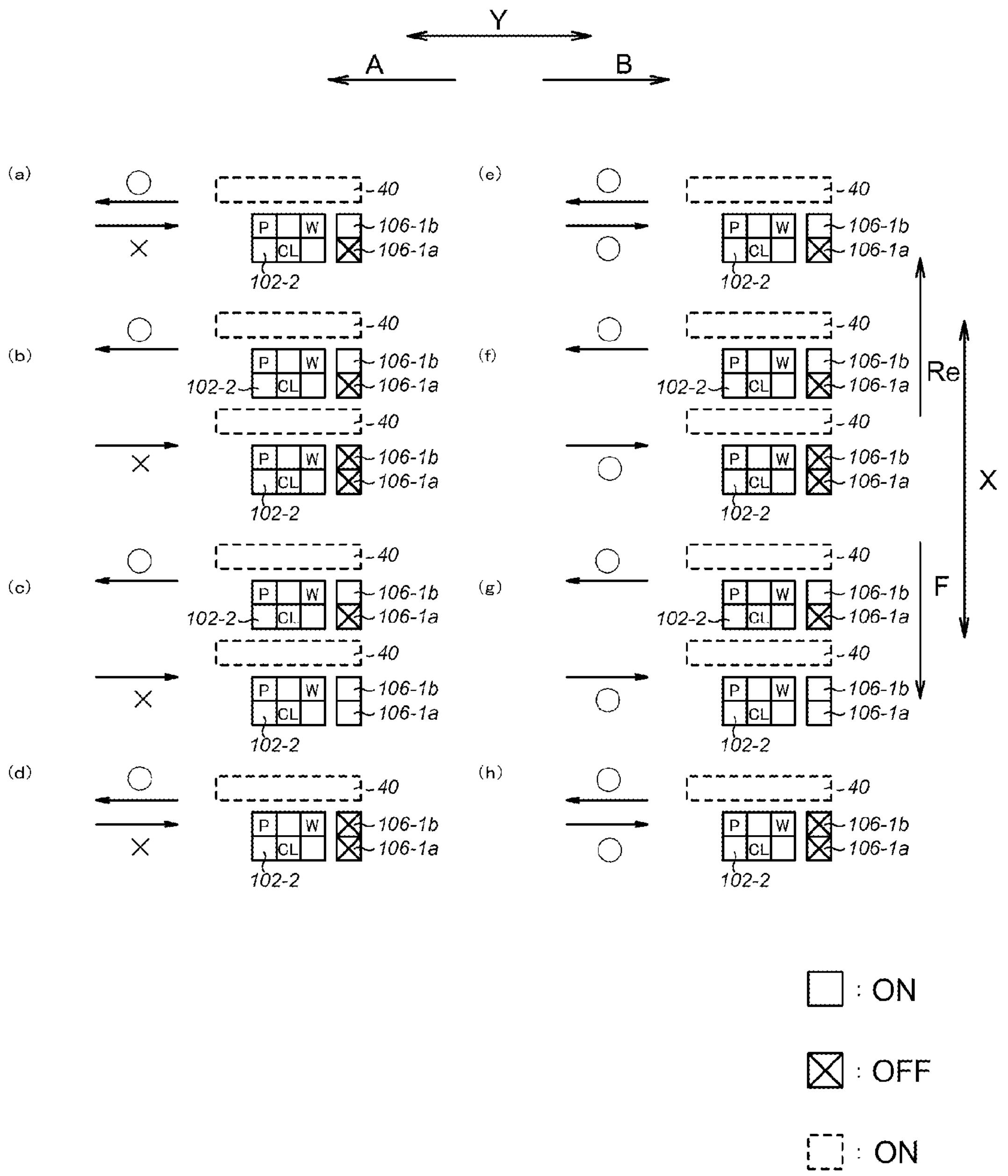
FIGS. 17(*a*) through (*h*) illustrate printing methods in Example 2 of Embodiment 3.

In Example 2, for the second printing, methods shown in, for example, FIGS. 17(*a*) through (*h*) may be used. The specifics of each method are clear from the figures, and will not be described.

(3-3) Example 3

Figure 18:
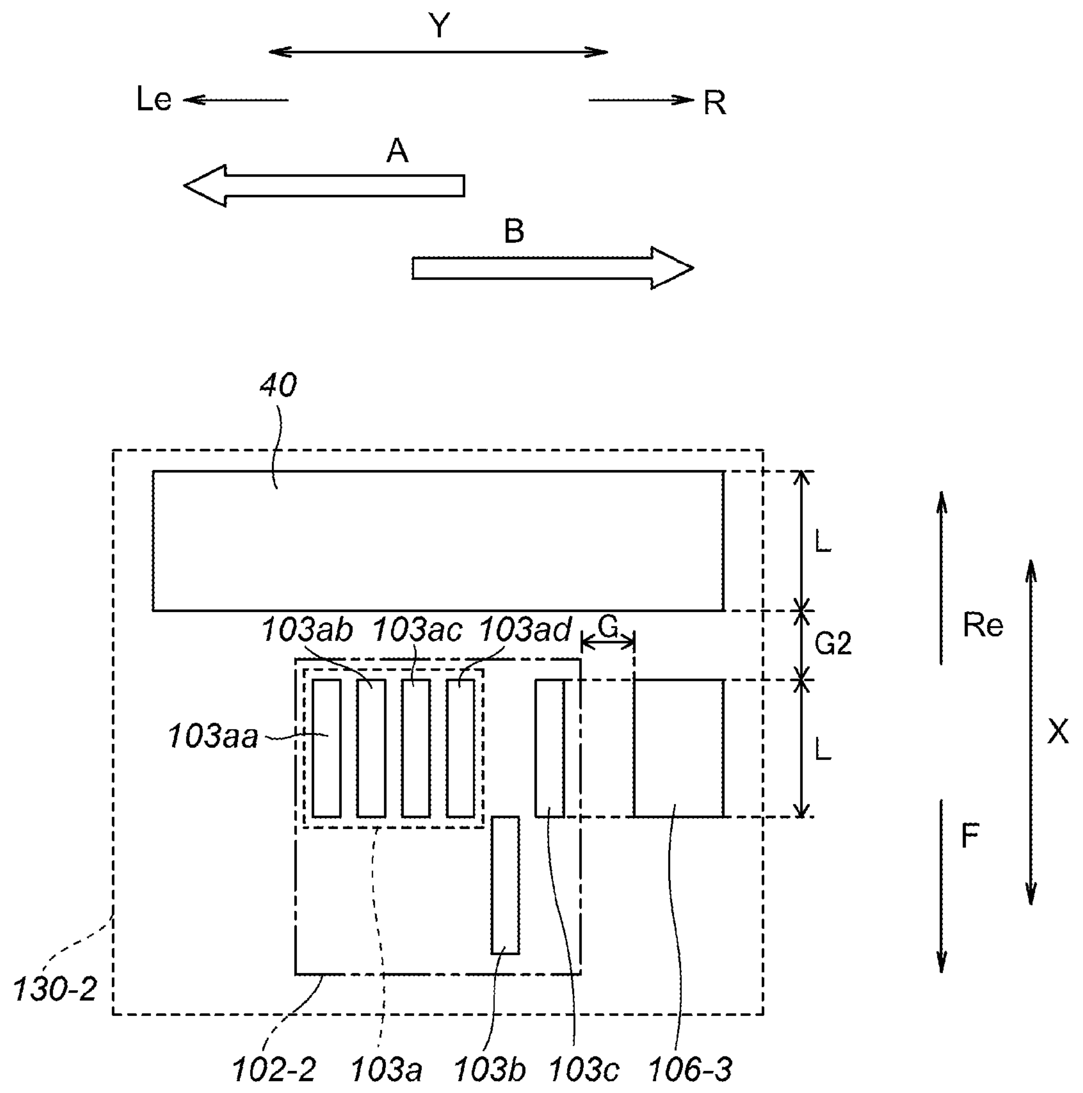
FIG. 18 shows an arrangement of an ink head unit and ultraviolet lamps in Example 3 of Embodiment 3.

As shown in FIG. 18, in Example 3, rightward to the process color ink head 103*a* and the white ink head 103*c*, an ultraviolet lamp 106-3 is located, and rearward to the ink head unit 102-2 and the ultraviolet lamp 106-3, the ultraviolet lamp 40 is located.

Figure 19:
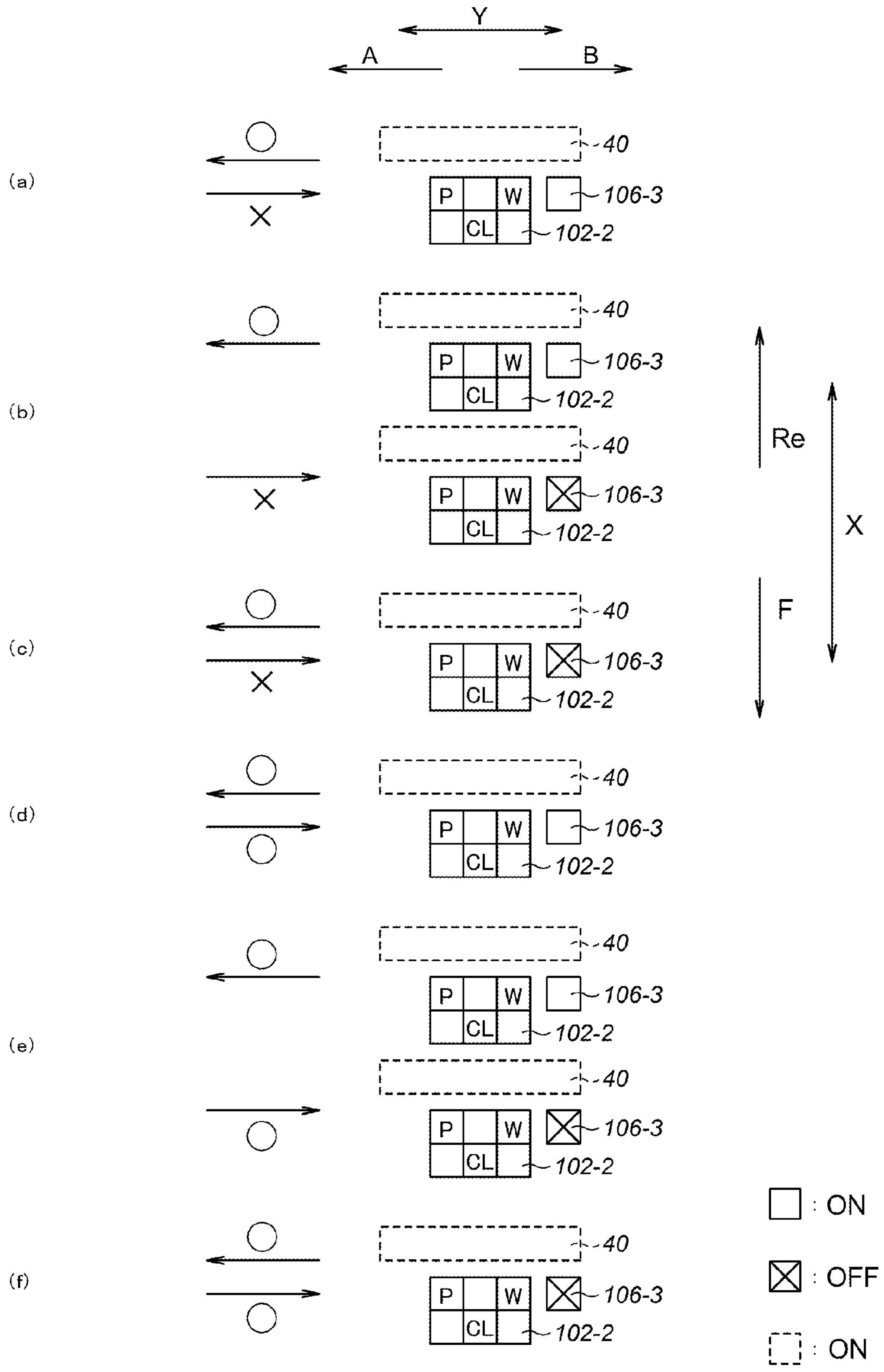
FIGS. 19(*a*) through (*f*) illustrate printing methods in Example 3 of Embodiment 3.

In Example 3, for the second printing, methods shown in, for example, FIGS. 19(*a*) through (*f*) may be used. The specifics of each method are clear from the figures, and will not be described.

(3-4) Example 4

Figure 20:
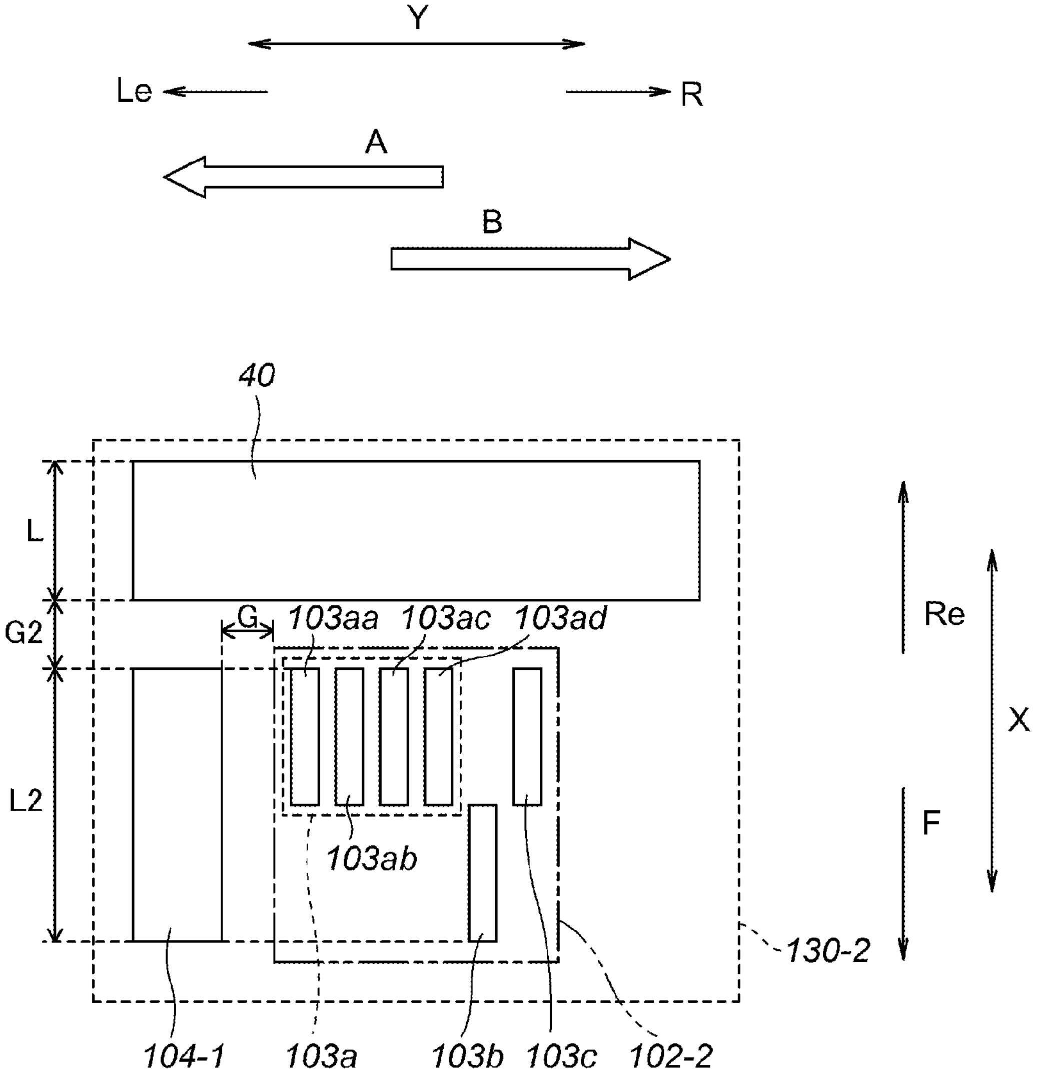
FIG. 20 shows an arrangement of an ink head unit and ultraviolet lamps in Example 4 of Embodiment 3.

As shown in FIG. 20, in Example 4, leftward to the process color ink head 103*a* and the white ink head 103*c*, the ultraviolet lamp 104-1 is located, and rearward to the ink head unit 102-2 and the ultraviolet lamp 104-1, the ultraviolet lamp 40 is located.

Figure 21:
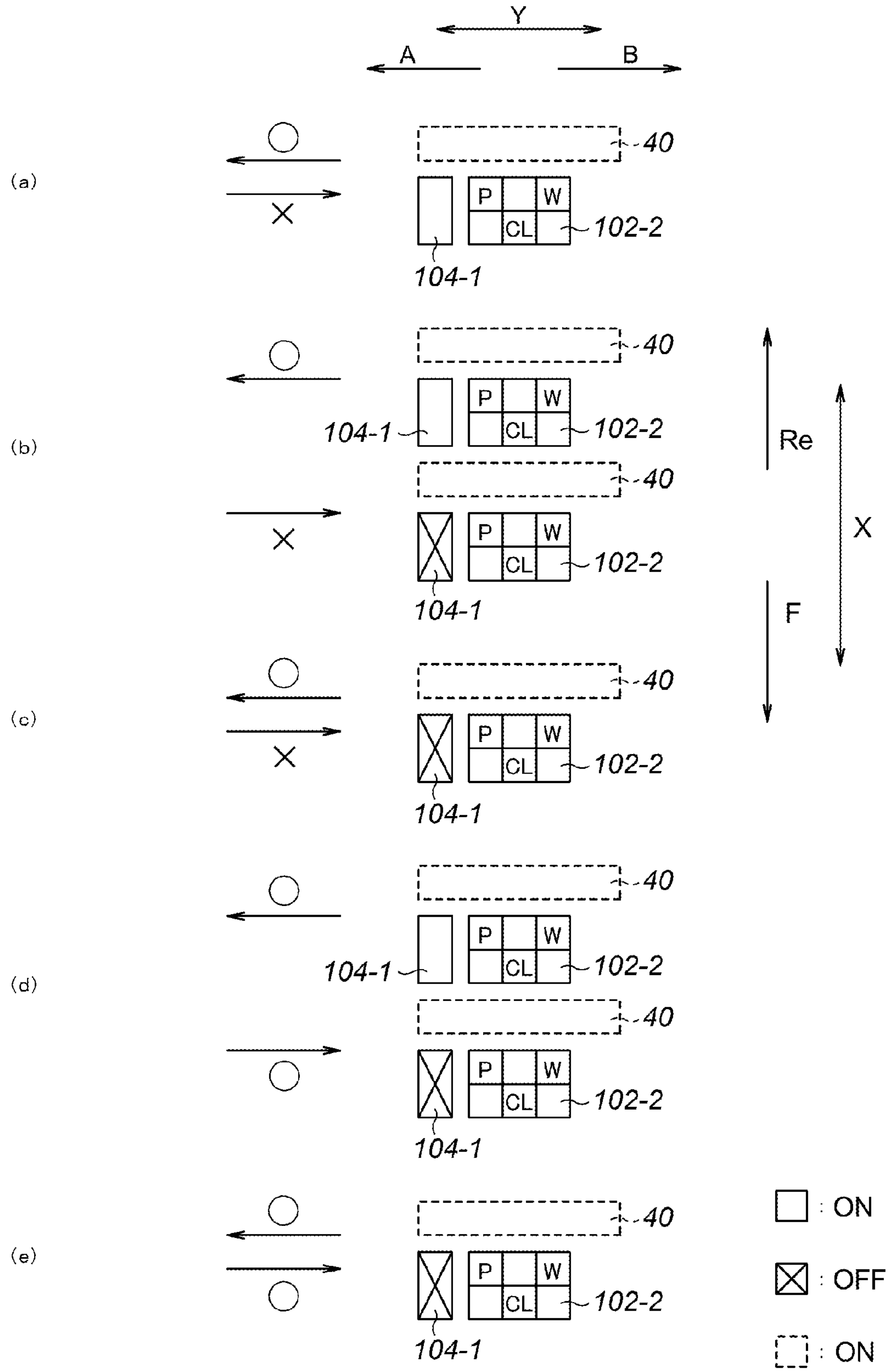
FIGS. 21(*a*) through (*e*) illustrate printing methods in Example 4 of Embodiment 3.

In Example 4, for the second printing, methods shown in, for example, FIGS. 21(*a*) through (*e*) may be used. The specifics of each method are clear from the figures, and will not be described.

(3-5) Example 5

Figure 22:
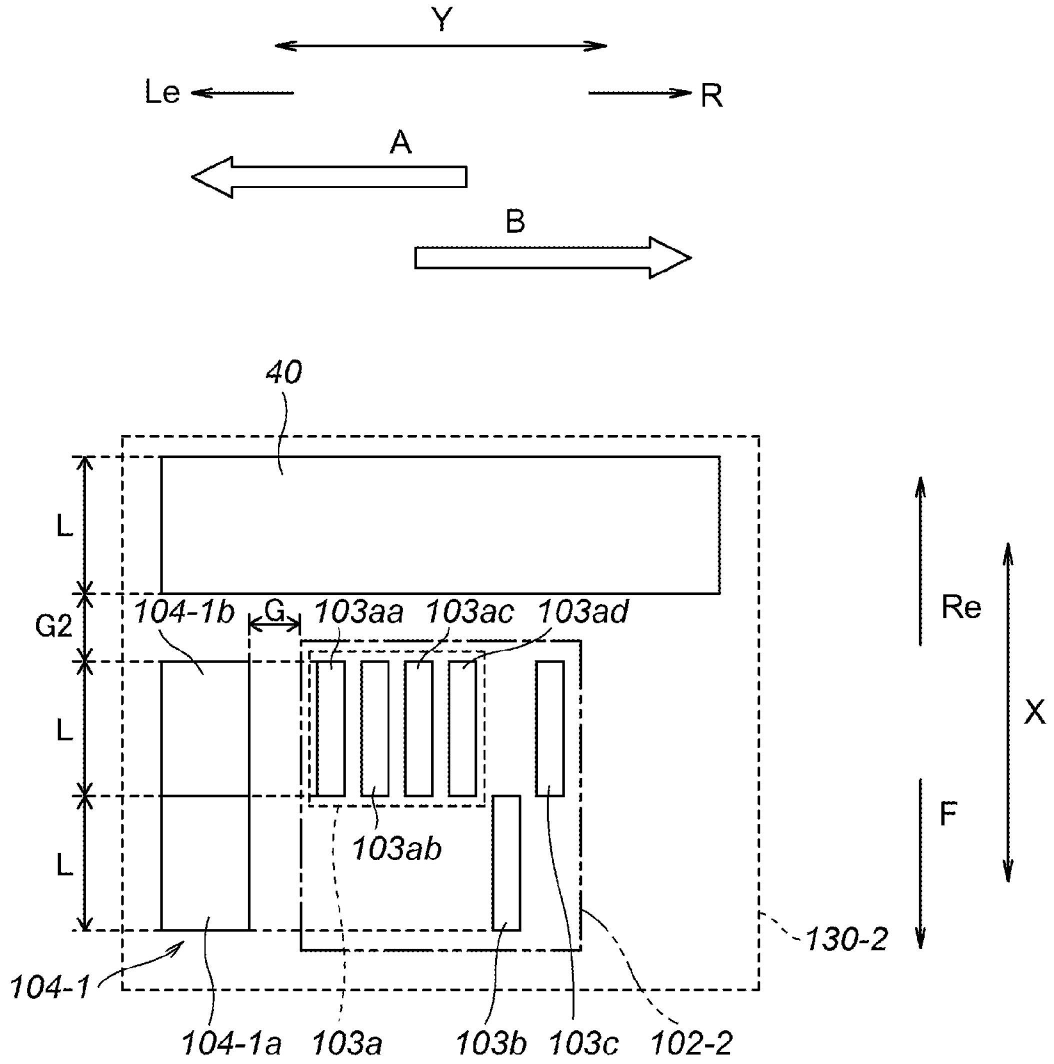
FIG. 22 shows an arrangement of an ink head unit and ultraviolet lamps in Example 5 of Embodiment 3.

As shown in FIG. 22, in Example 5, leftward to the clear ink head 103*b*, the ultraviolet lamp 104-1*a* is located; leftward to the process color ink head 103*a* and the white ink head 103*c*, the ultraviolet lamp 104-1*b* is located; and rearward to the ink head unit 102-2 and the ultraviolet lamp 104-1 (i.e., the ultraviolet lamps 104-1*a* and 104-1*b*), the ultraviolet lamp 40 is located.

Figure 23:
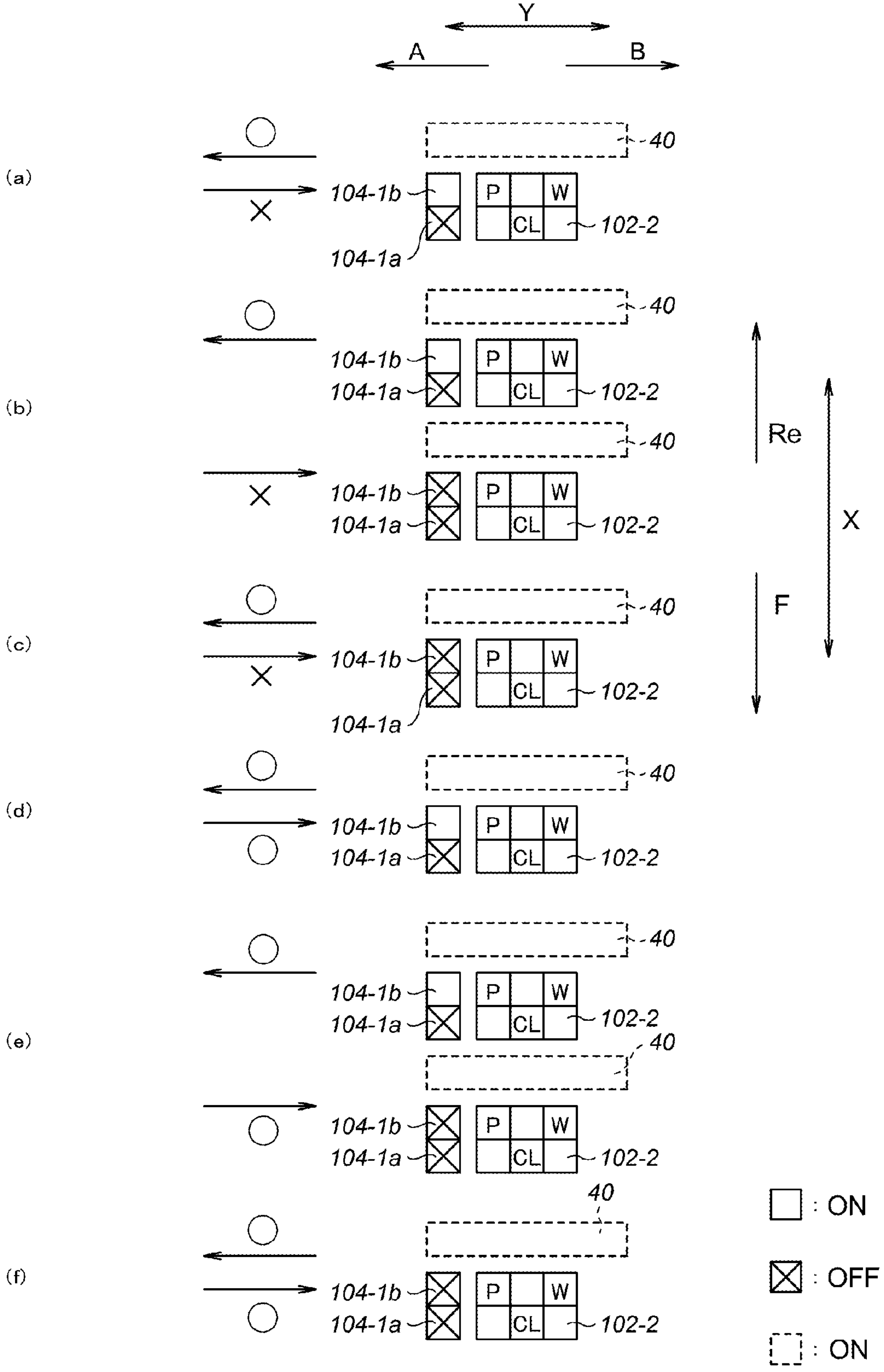
FIGS. 23(*a*) through (*f*) illustrate printing methods in Example 5 of Embodiment 3.

In Example 5, for the second printing, methods shown in, for example, FIGS. 23(*a*) through (*f*) may be used. The specifics of each method are clear from the figures, and will not be described.

(3-6) Example 6

Figure 24:
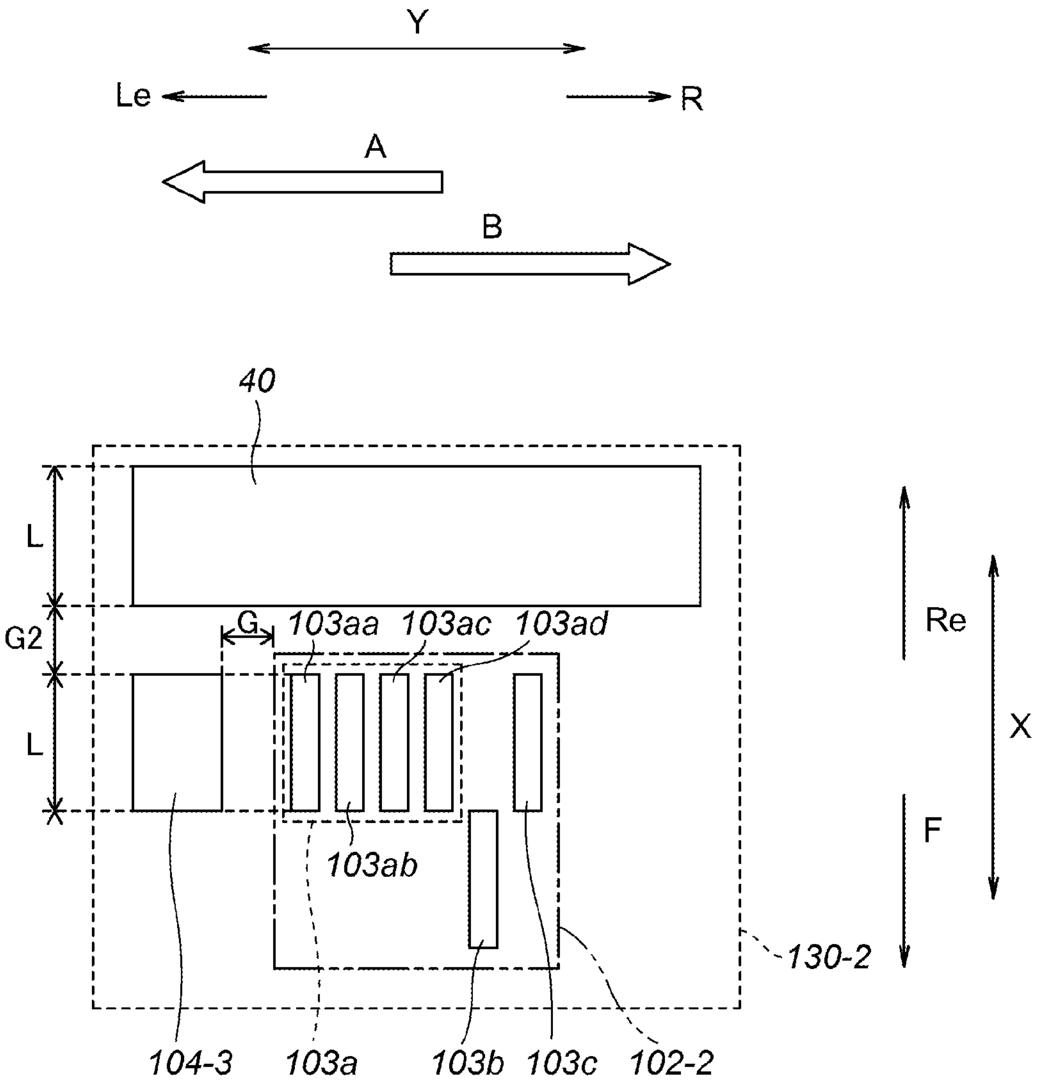
FIG. 24 shows an arrangement of an ink head unit and ultraviolet lamps in Example 6 of Embodiment 3.

As shown in FIG. 24, in Example 6, leftward to the process color ink head 103*a* and the white ink head 103*c*, an ultraviolet lamp 104-3 is located, and rearward to the ink head unit 102-2 and the ultraviolet lamp 104-3, the ultraviolet lamp 40 is located.

Figure 25:
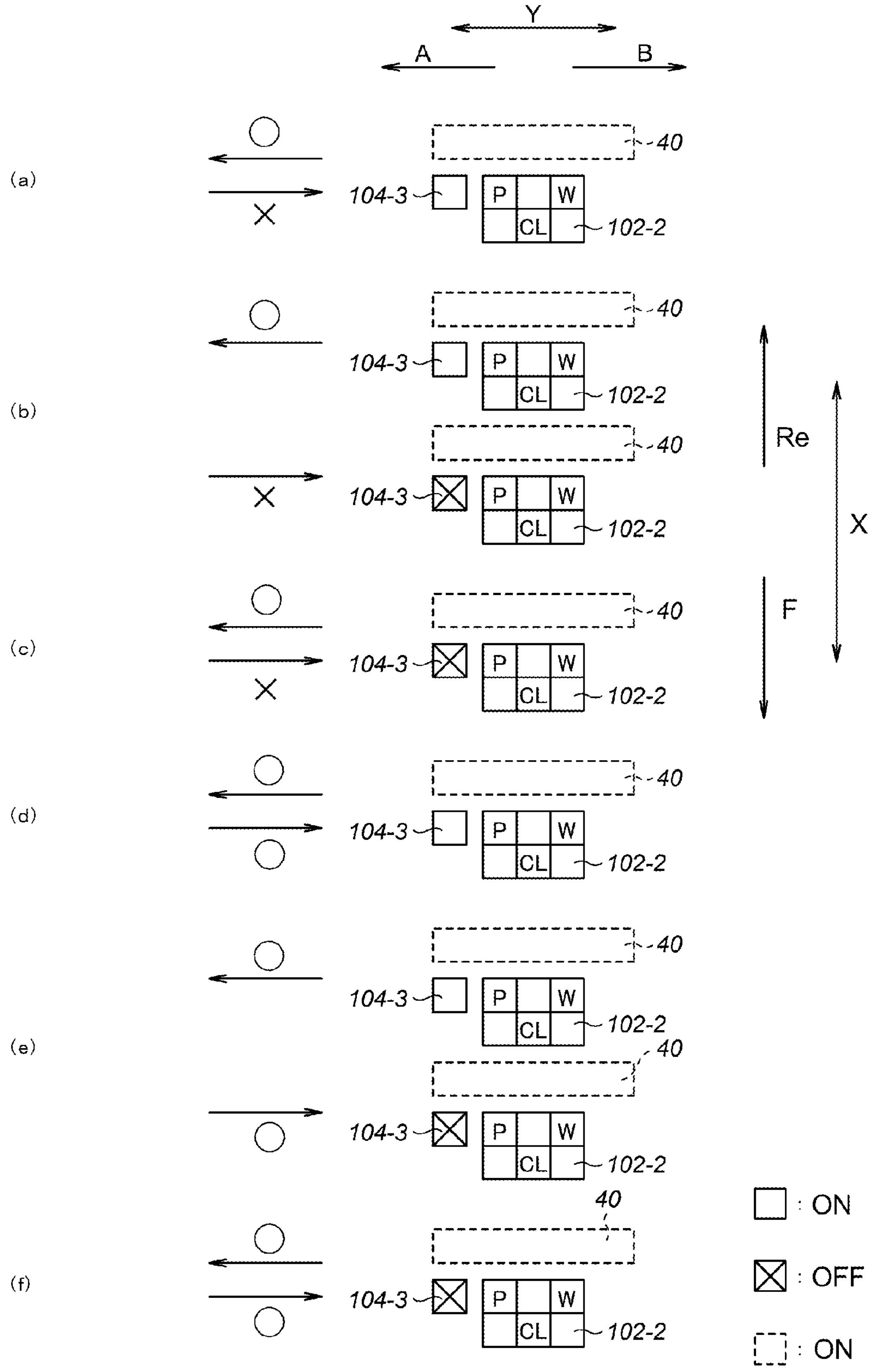
FIGS. 25(*a*) through (*f*) illustrate printing methods in Example 6 of Embodiment 3.

In Example 6, for the second printing, methods shown in, for example, FIGS. 25(*a*) through (*f*) may be used. The specifics of each method are clear from the figures, and will not be described.

(4) Embodiment 4

Figure 26:
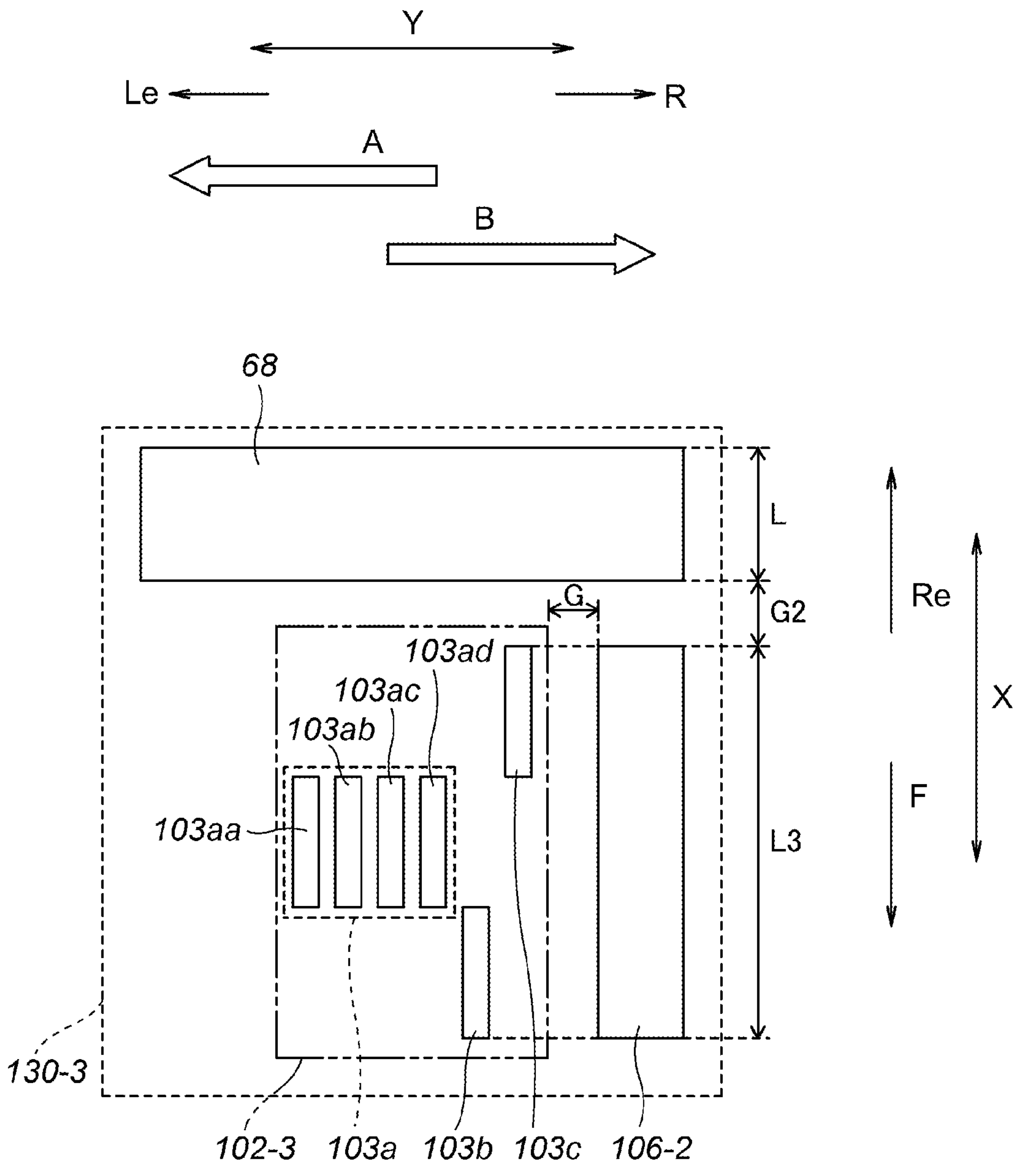
FIG. 26 shows an arrangement of an ink head unit and ultraviolet lamps in Example 1 of Embodiment 4.

As shown in FIG. 26, in Embodiment 4, the clear ink head 103*b* is located forward to the process color ink head 103*a*, and the white ink head 103*c* is located rearward to the process color ink head 103*a*. In Embodiment 4 also, the first printing of ejecting the process color ink and the white ink from an ink head unit 102-3 while sequentially transferring the recording paper forward, and the second printing of ejecting the clear ink from the ink head unit 102-3 while sequentially transferring the recording paper rearward, are performed.

(4-1) Example 1

FIG. 26 shows the ink head unit 102-3 and the like in Example 1 of Embodiment 4. Rightward to the ink head unit 102-3, an ultraviolet lamp 106-2 is located. Length L3 of the irradiation area of the ultraviolet lamp 106-2 in the forward-rearward direction is equal to a total length of the irradiation areas of the clear ink head 103*b*, the process color ink head 103*a*, and the white ink head 103*c* in the forward-rearward direction. Rearward to the ink head unit 102-3 and the ultraviolet lamp 106-2, an ultraviolet lamp 68 is located. The ink head unit 102-3 and the ultraviolet lamps 68 and 106-2 are mounted on a carriage 130-3.

Figure 27:
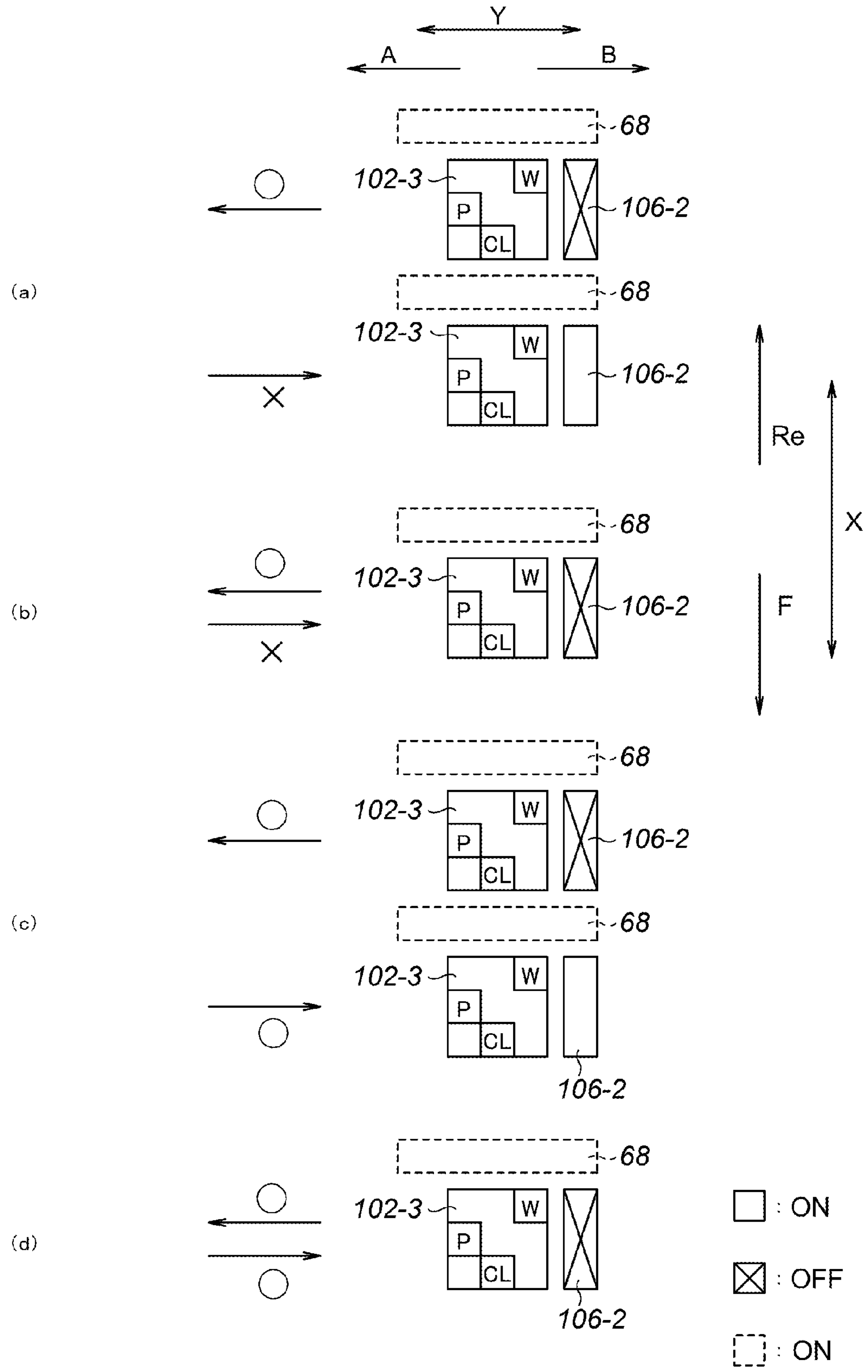
FIGS. 27(*a*) through (*d*) illustrate printing methods in Example 1 of Embodiment 4.

In Example 1, for the second printing, methods shown in, for example, FIGS. 27(*a*) through (*d*) may be used. The specifics of each method are clear from the figures, and will not be described.

(4-2) Example 2

Figure 28:
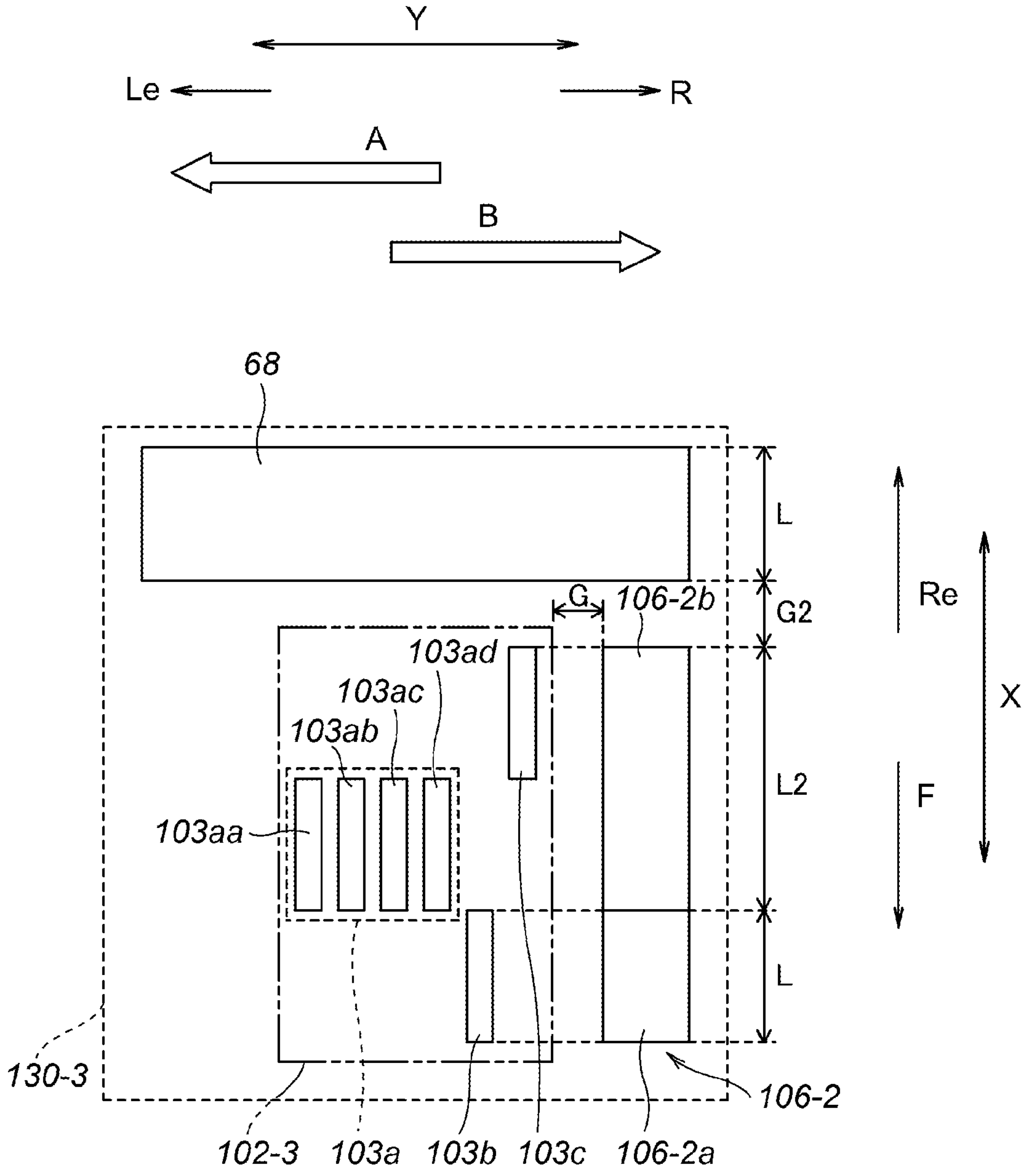
FIG. 28 shows an arrangement of an ink head unit and ultraviolet lamps in Example 2 of Embodiment 4.

As shown in FIG. 28, in Example 2, rightward to the clear ink head 103*b*, an ultraviolet lamp 106-2*a* is located; rightward to the process color ink head 103*a* and the white ink head 103*c*, an ultraviolet lamp 106-2*b* is located; and rearward to the ink head unit 102-3 and the ultraviolet lamp 106-2 (i.e., the ultraviolet lamps 106-2*a* and 106-2*b*), the ultraviolet lamp 68 is located. Length L of the ultraviolet lamp 106-2*a* in the forward-rearward direction is equal to the length of the clear ink head 103*b* in the forward-rearward direction. Length L2 of the ultraviolet lamp 106-2*b* in the forward-rearward direction is equal to a total length of the process color ink head 103*a* and the white ink head 103*c* in forward-rearward direction.

Figure 29:
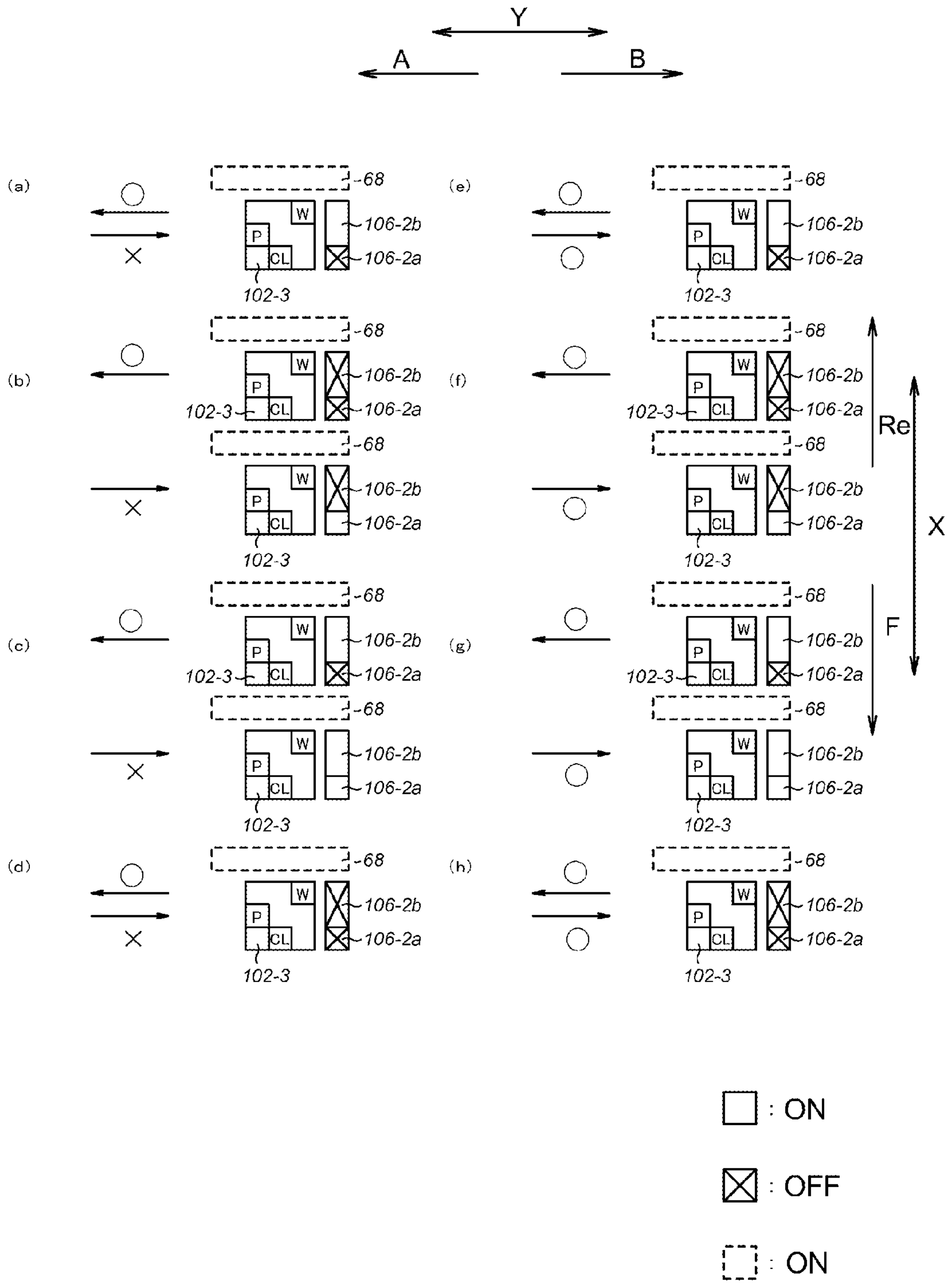
FIGS. 29(*a*) through (*h*) illustrate printing methods in Example 2 of Embodiment 4.

In Example 2, for the second printing, methods shown in, for example, FIGS. 29(*a*) through (*h*) may be used. The specifics of each method are clear from the figures, and will not be described.

(4-3) Example 3

Figure 30:
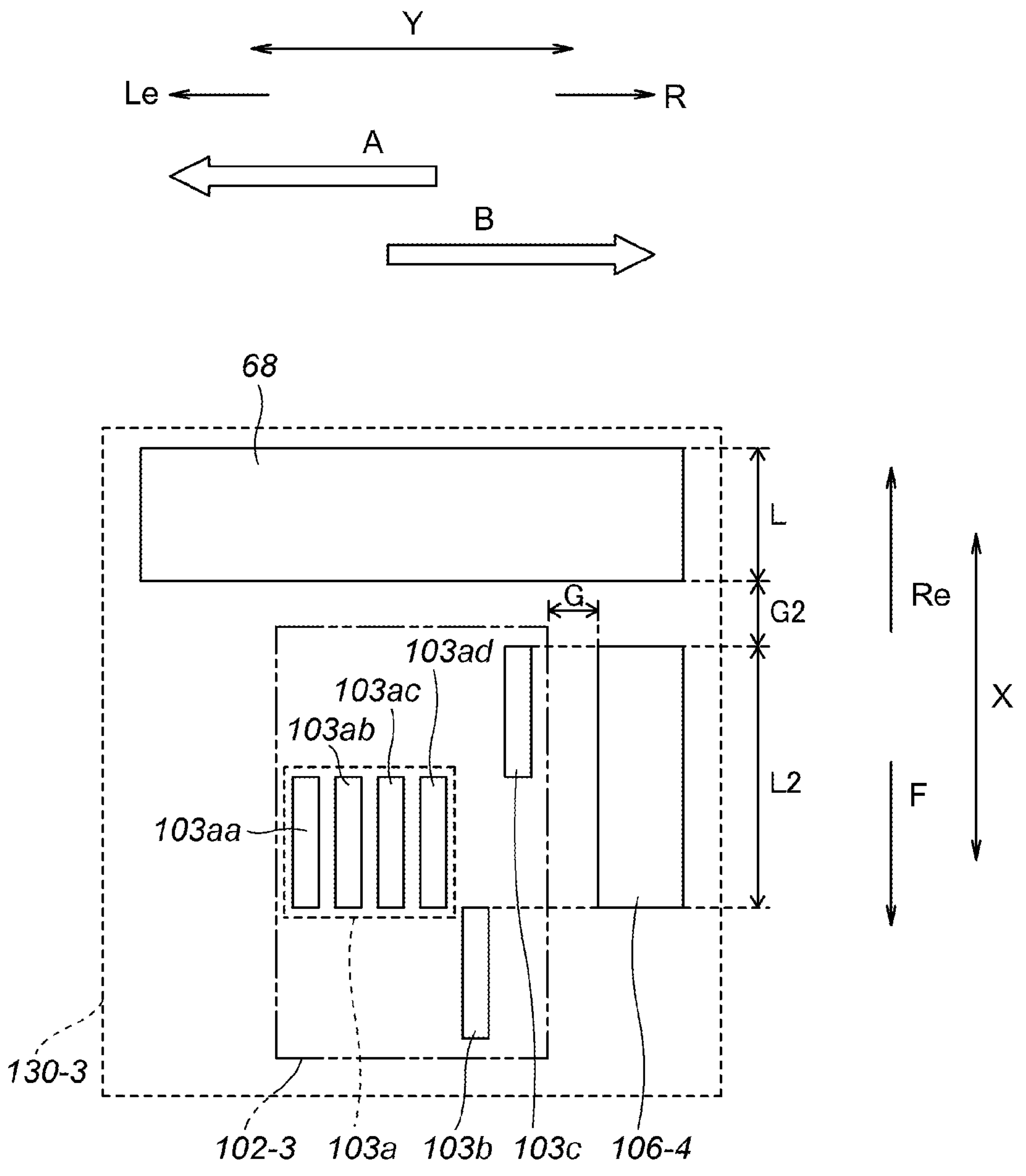
FIG. 30 shows an arrangement of an ink head unit and ultraviolet lamps in Example 3 of Embodiment 4.

As shown in FIG. 30, in Example 3, rightward to the process color ink head 103*a* and the white head 103*c*, an ultraviolet lamp 106-4 is located, and rearward to the ink head unit 102-3 and the ultraviolet lamp 106-4, the ultraviolet lamp 68 is located.

Figure 31:
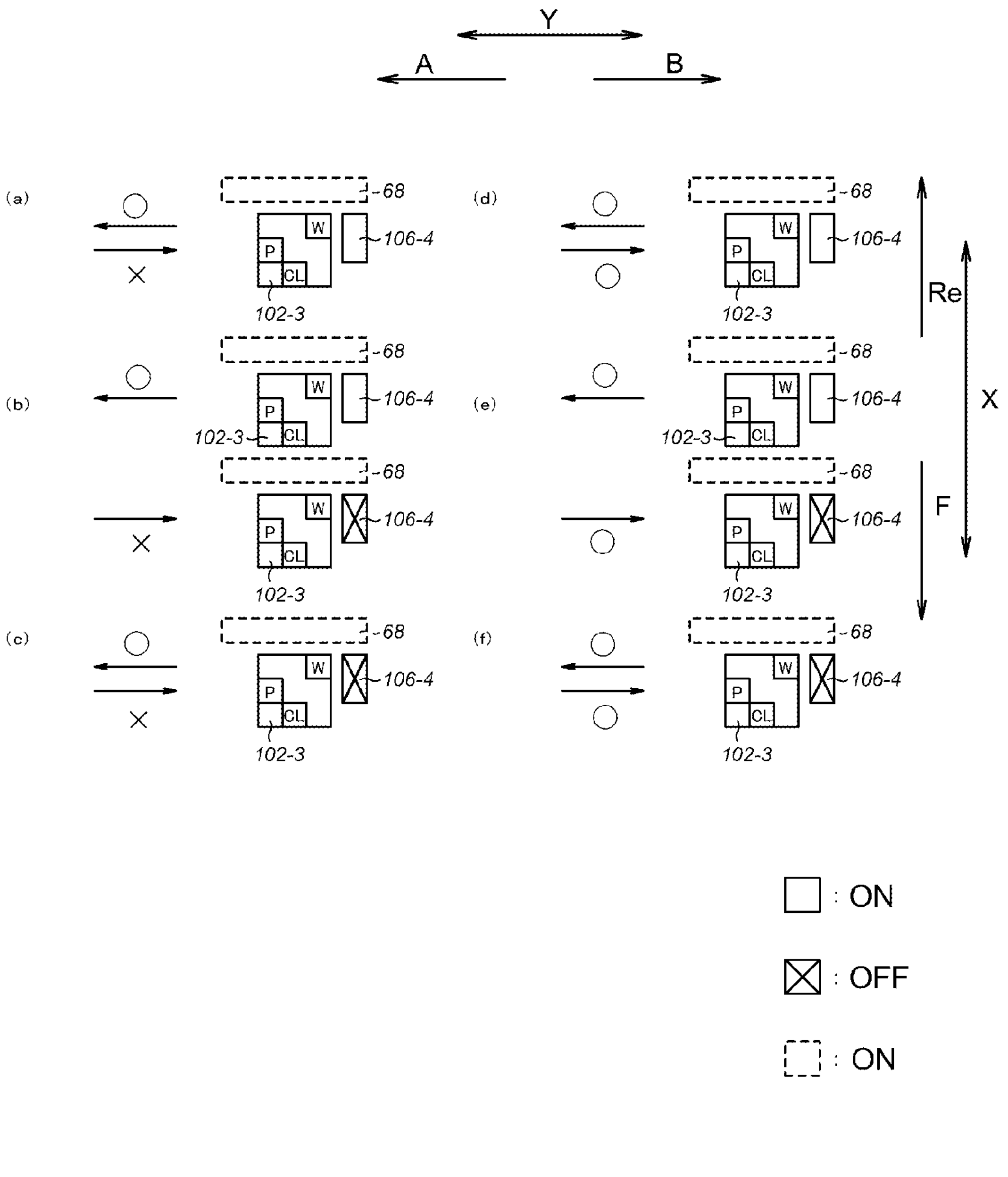
FIGS. 31(*a*) through (*f*) illustrate printing methods in Example 3 of Embodiment 4.

In Example 3, for the second printing, methods shown in, for example, FIGS. 31(*a*) through (*f*) may be used. The specifics of each method are clear from the figures, and will not be described.

(4-4) Example 4

Figure 32:
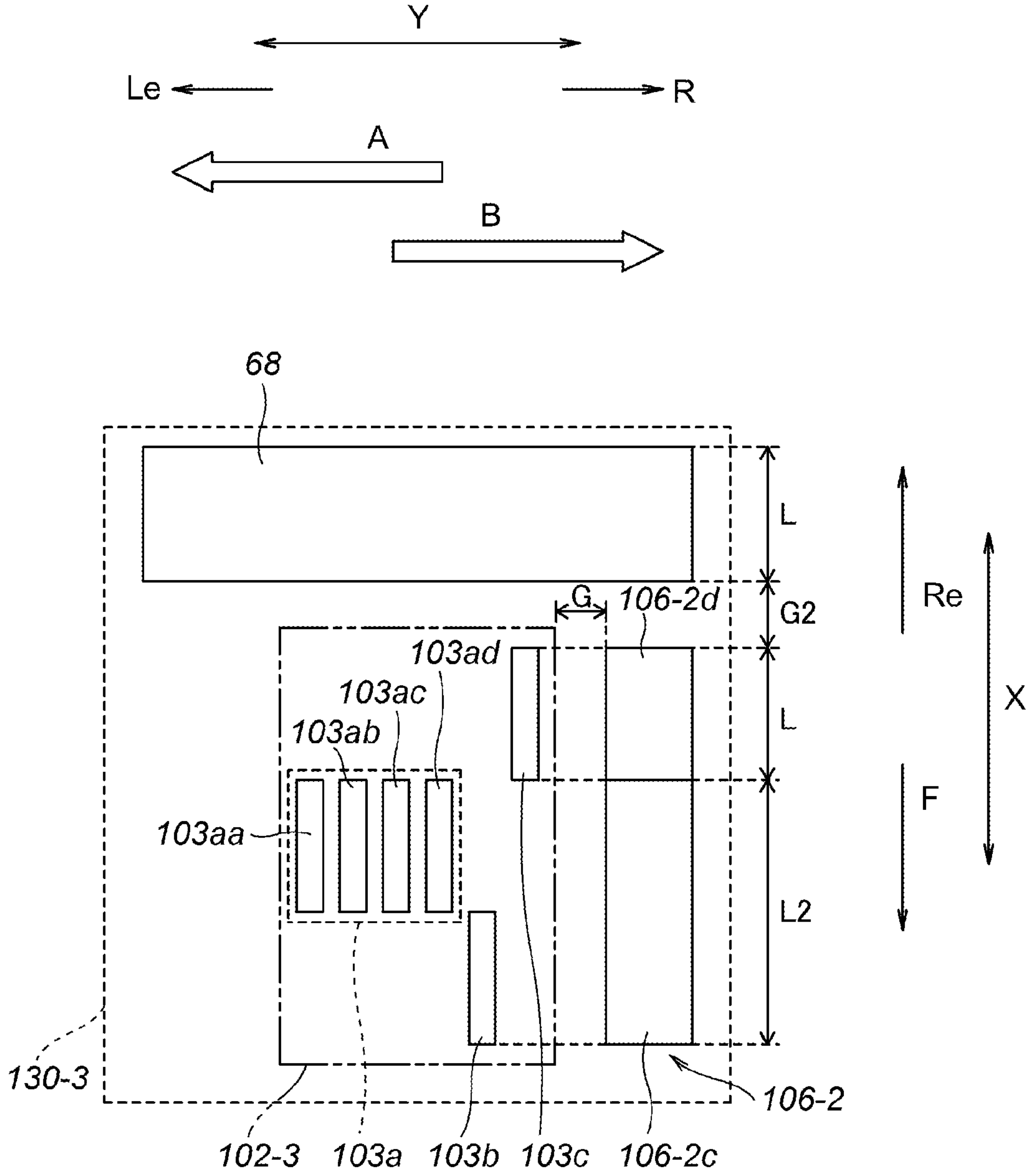
FIG. 32 shows an arrangement of an ink head unit and ultraviolet lamps in Example 4 of Embodiment 4.

As shown in FIG. 32, in Example 4, rightward to the process color ink head 103*a* and the clear ink head 103*b*, an ultraviolet lamp 106-2*c* is located; rightward to the white ink head 103*c*, an ultraviolet lamp 106-2*d* is located; and rearward to the ink head unit 102-3 and the ultraviolet lamp 106-2 (i.e., ultraviolet lamps 106-2*c* and 106-2*d*), the ultraviolet lamp 68 is located.

Figure 33:
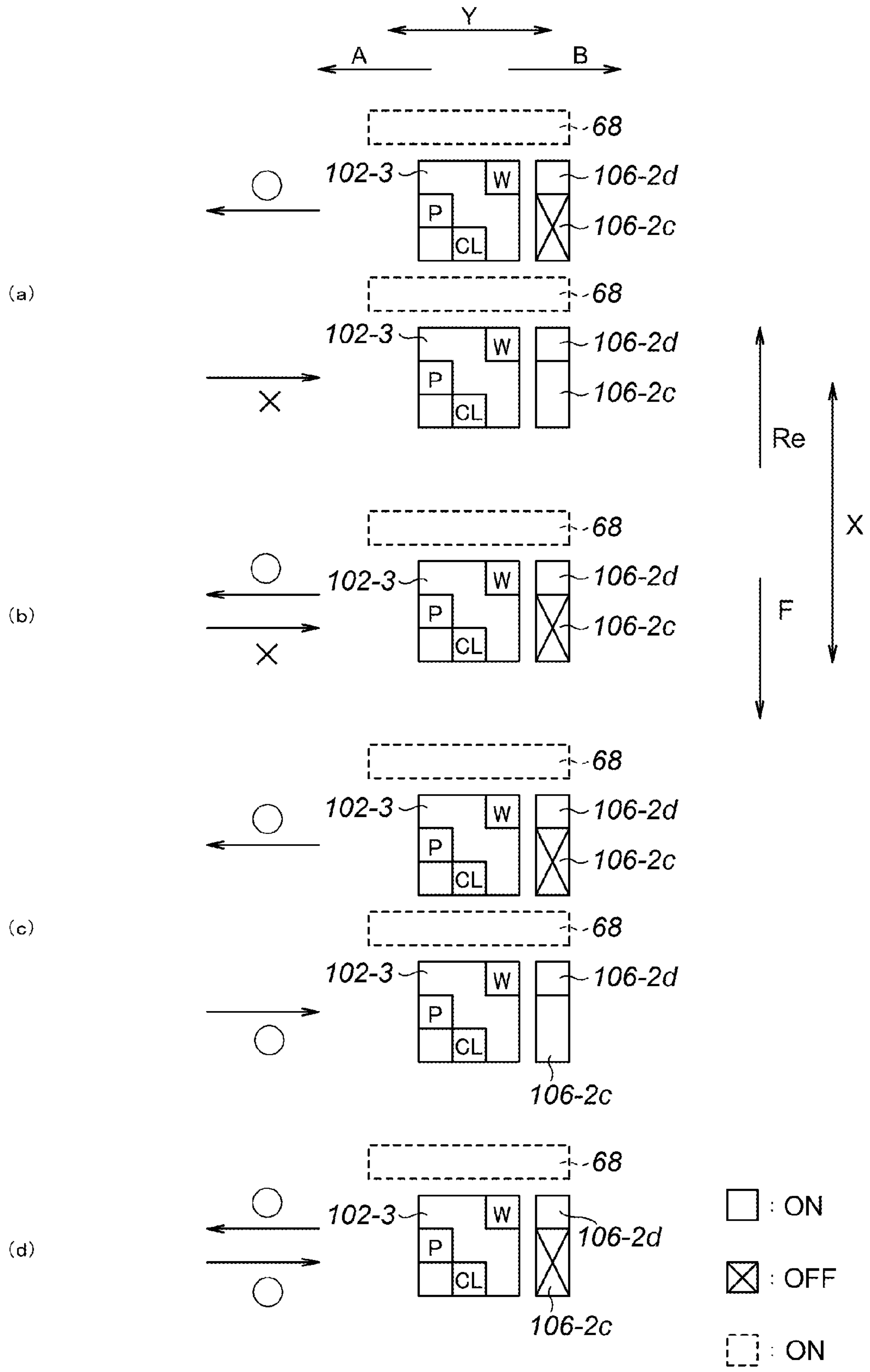
FIGS. 33(*a*) through (*d*) illustrate printing methods in Example 4 of Embodiment 4.

In Example 4, for the second printing, methods shown in, for example, FIGS. 33(*a*) through (*d*) may be used. The specifics of each method are clear from the figures, and will not be described.

(4-5) Example 5

Figure 34:
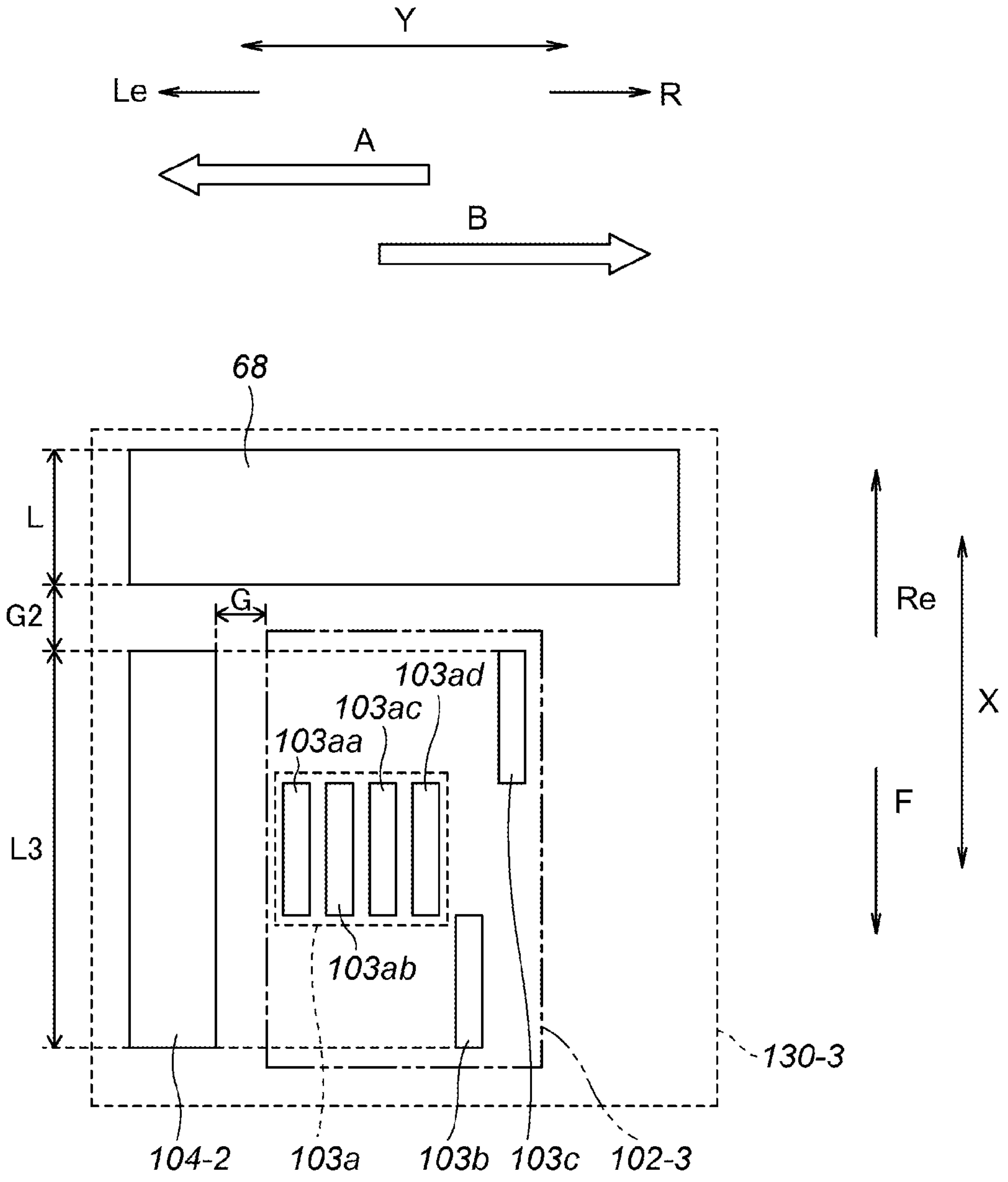
FIG. 34 shows an arrangement of an ink head unit and ultraviolet lamps in Example 5 of Embodiment 4.

As shown in FIG. 34, in Example 5, leftward to the ink head unit 102-3, an ultraviolet lamp 104-2 is located, and rearward to the ink head unit 102-3 and the ultraviolet lamp 104-2, the ultraviolet lamp 68 is located.

Figure 35:
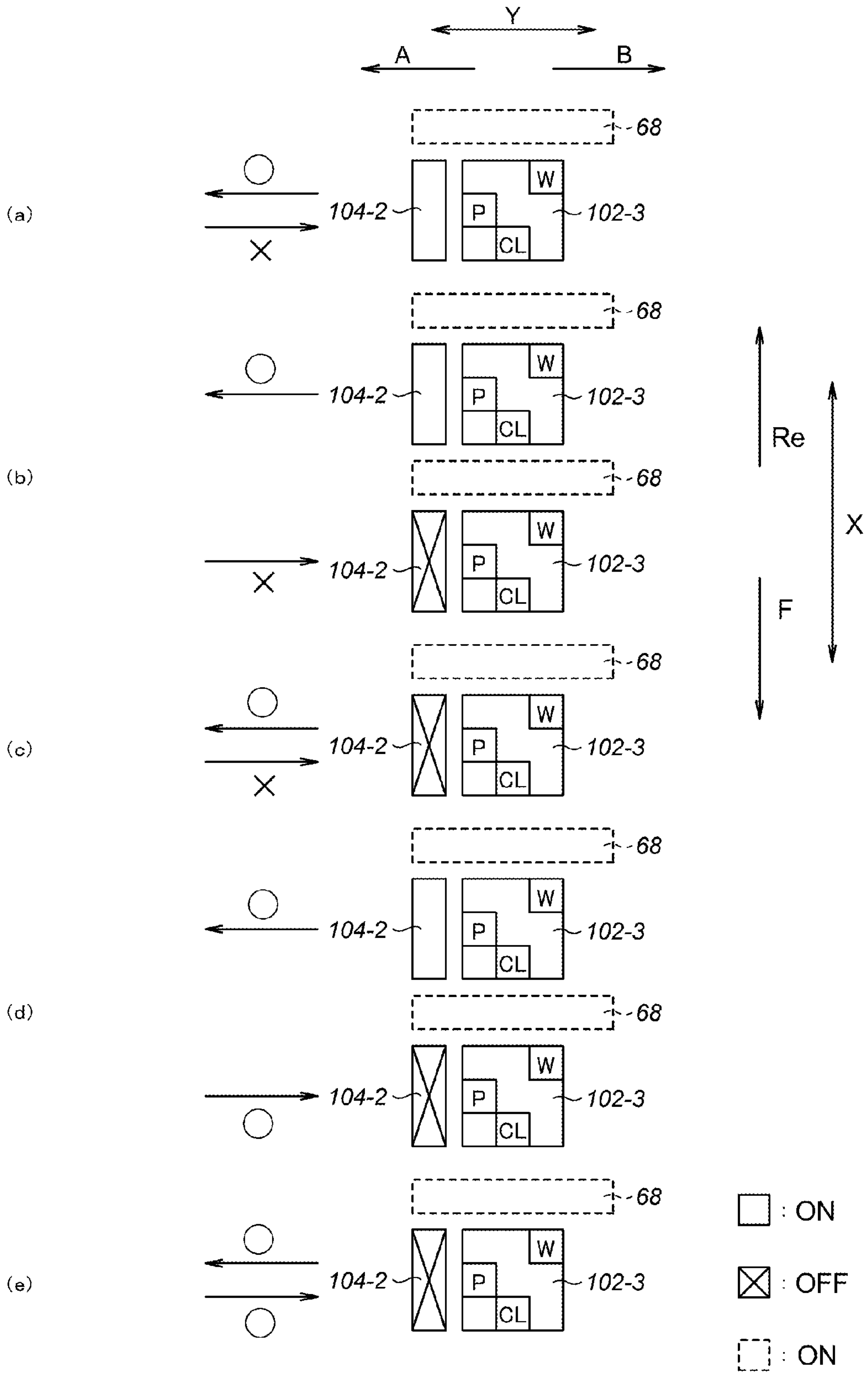
FIGS. 35(*a*) through (*e*) illustrate printing methods in Example 5 of Embodiment 4.

In Example 5, for the second printing, methods shown in, for example, FIGS. 35(*a*) through (*e*) may be used. The specifics of each method are clear from the figures, and will not be described.

(4-6) Example 6

Figure 36:
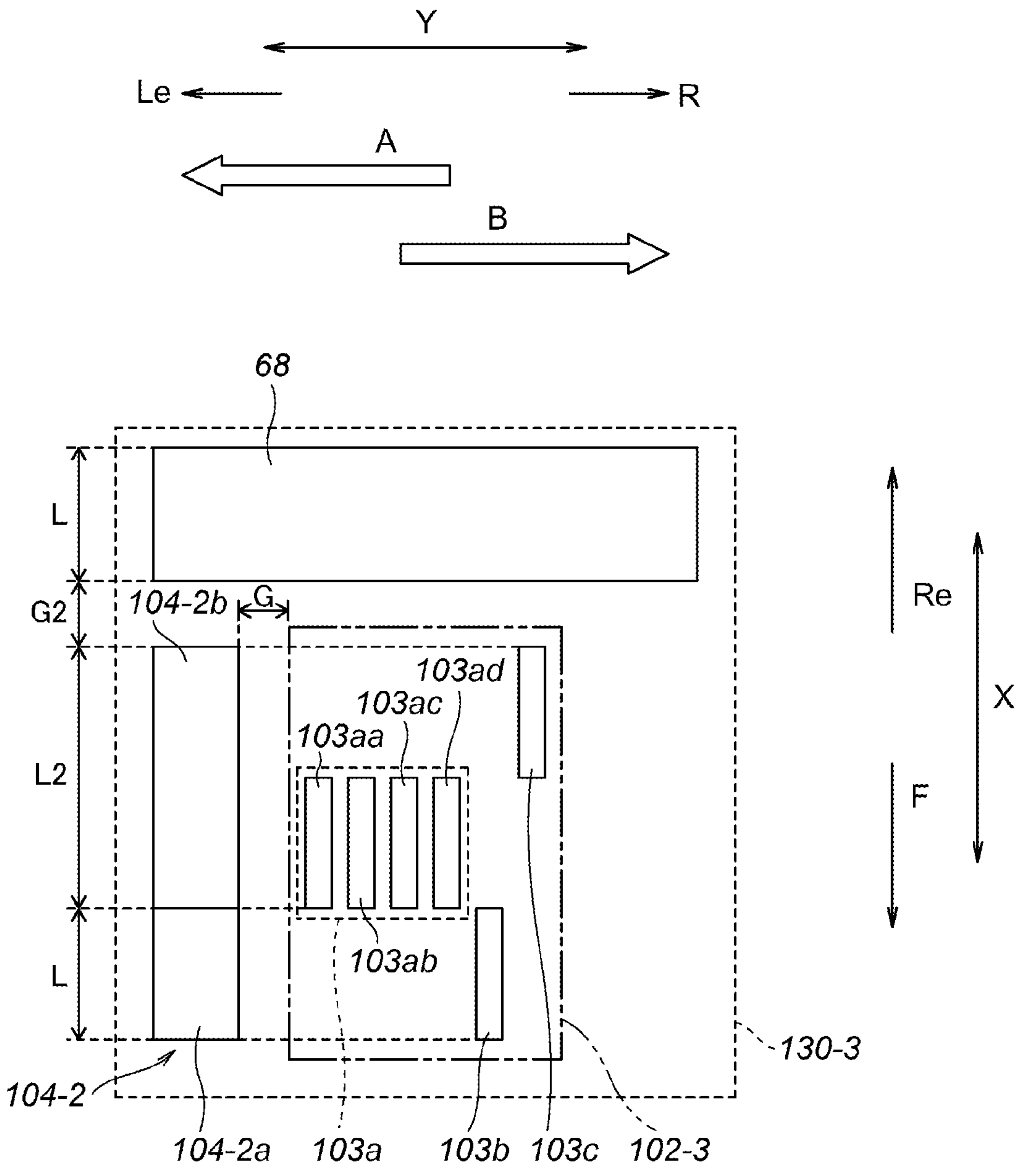
FIG. 36 shows an arrangement of an ink head unit and ultraviolet lamps in Example 6 of Embodiment 4.

As shown in FIG. 36, in Example 6, leftward to the clear ink head 103*b*, an ultraviolet lamp 104-2*a* is located; leftward to the process color ink head 103*a* and the white ink head 103*c*, an ultraviolet lamp 104-2*b* is located; and rearward to the ink head unit 102-3 and the ultraviolet lamp 104-2 (i.e., the ultraviolet lamps 104-2*a* and 104-2*b*), the ultraviolet lamp 68 is located.

Figure 37:
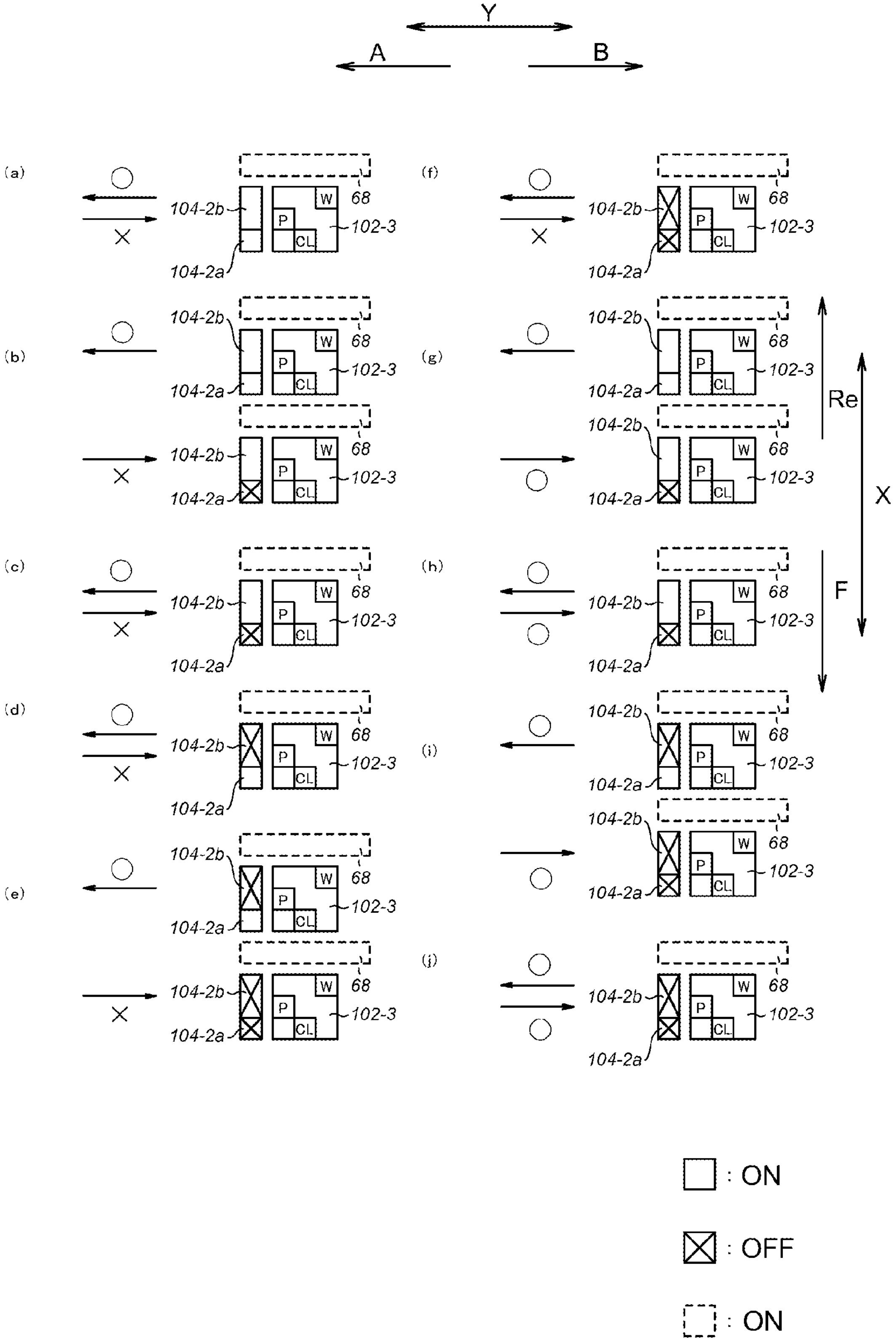
FIGS. 37(*a*) through (*j*) illustrate printing methods in Example 6 of Embodiment 4.

In Example 6, for the second printing, methods shown in, for example, FIGS. 37(*a*) through (*j*) may be used. The specifics of each method are clear from the figures, and will not be described.

(4-7) Example 7

Figure 38:
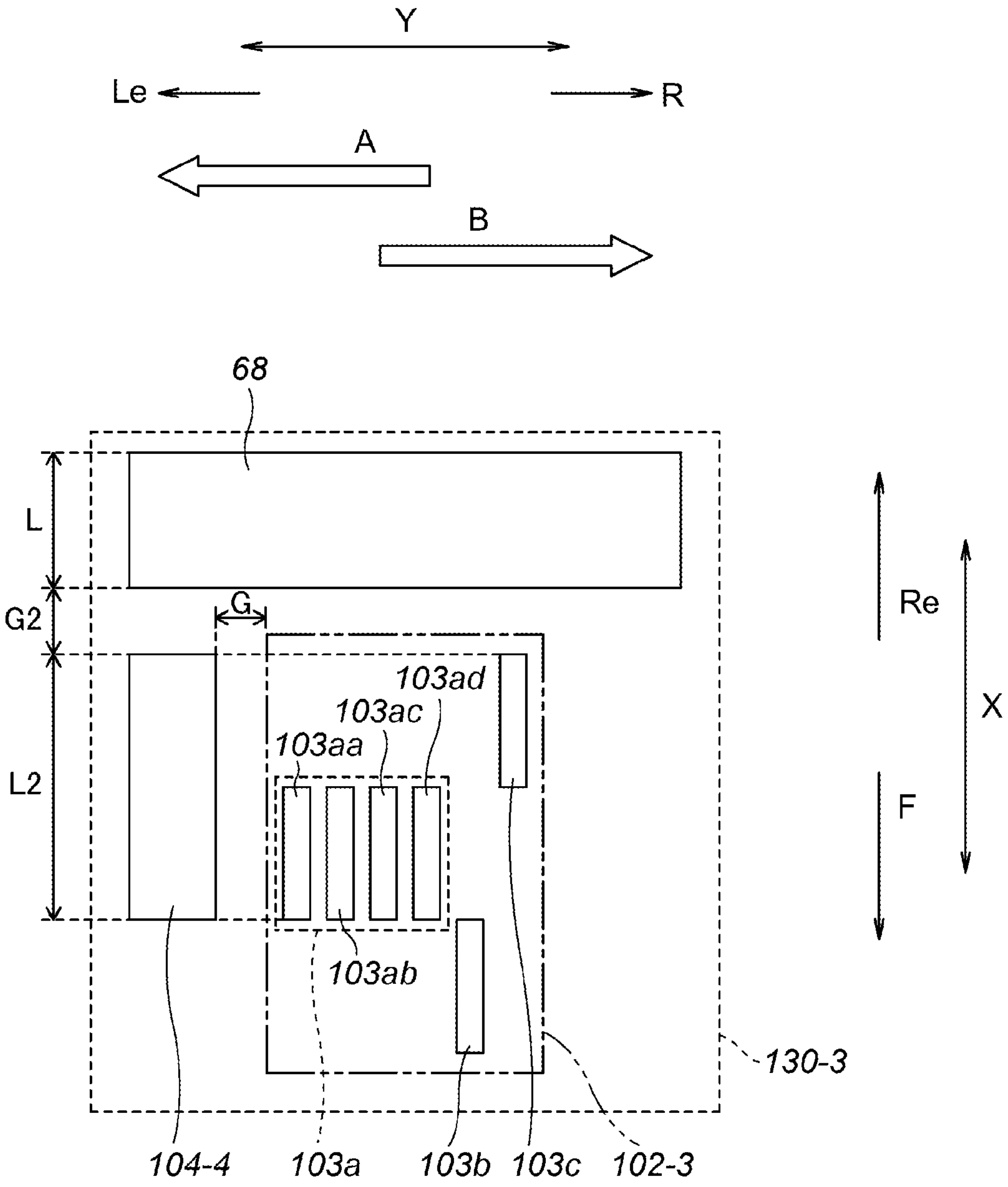
FIG. 38 shows an arrangement of an ink head unit and ultraviolet lamps in Example 7 of Embodiment 4.

As shown in FIG. 38, in Example 7, leftward to the process color ink head 103*a* and the white ink head 103*c*, an ultraviolet lamp 104-4 is located, and rearward to the ink head unit 102-3 and the ultraviolet lamp 104-4, the ultraviolet lamp 68 is located.

Figure 39:
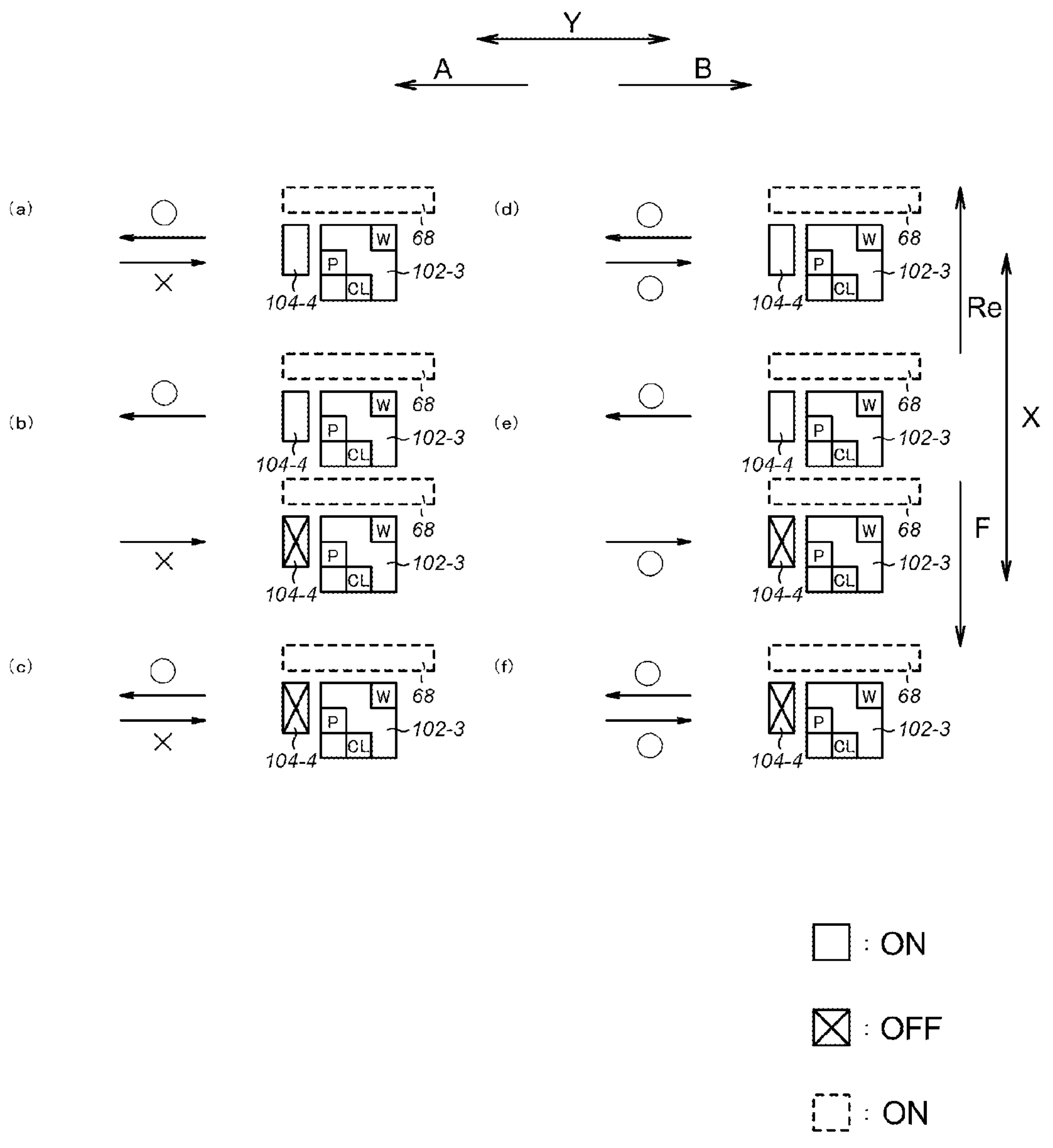
FIGS. 39(*a*) through (*f*) illustrate printing methods in Example 7 of Embodiment 4.

In Example 7, for the second printing, methods shown in, for example, FIGS. 39(*a*) through (*f*) may be used. The specifics of each method are clear from the figures, and will not be described.

(4-8) Example 8

Figure 40:
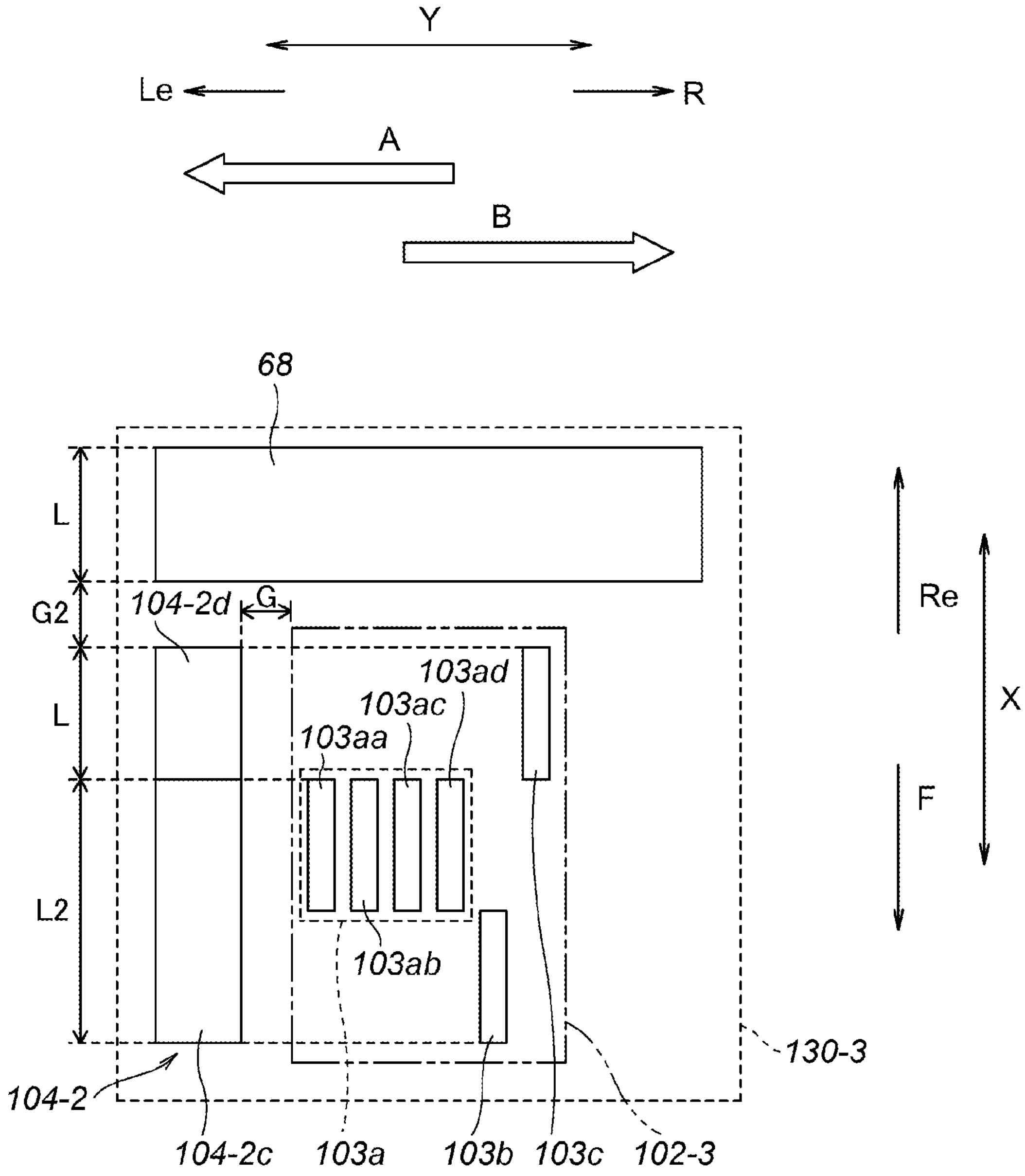
FIG. 40 shows an arrangement of an ink head unit and ultraviolet lamps in Example 8 of Embodiment 4.

As shown in FIG. 40, in Example 8, leftward to the clear ink head 103*b* and the process color ink head 103*a*, an ultraviolet lamp 104-2*c* is located; leftward to the white ink head 103*c*, an ultraviolet lamp 104-2*d* is located; and rearward to the ink head unit 102-3 and the ultraviolet lamp 104-2 (i.e., the ultraviolet lamps 104-2*c* and 104-2*d*), the ultraviolet lamp 68 is located.

Figure 41:
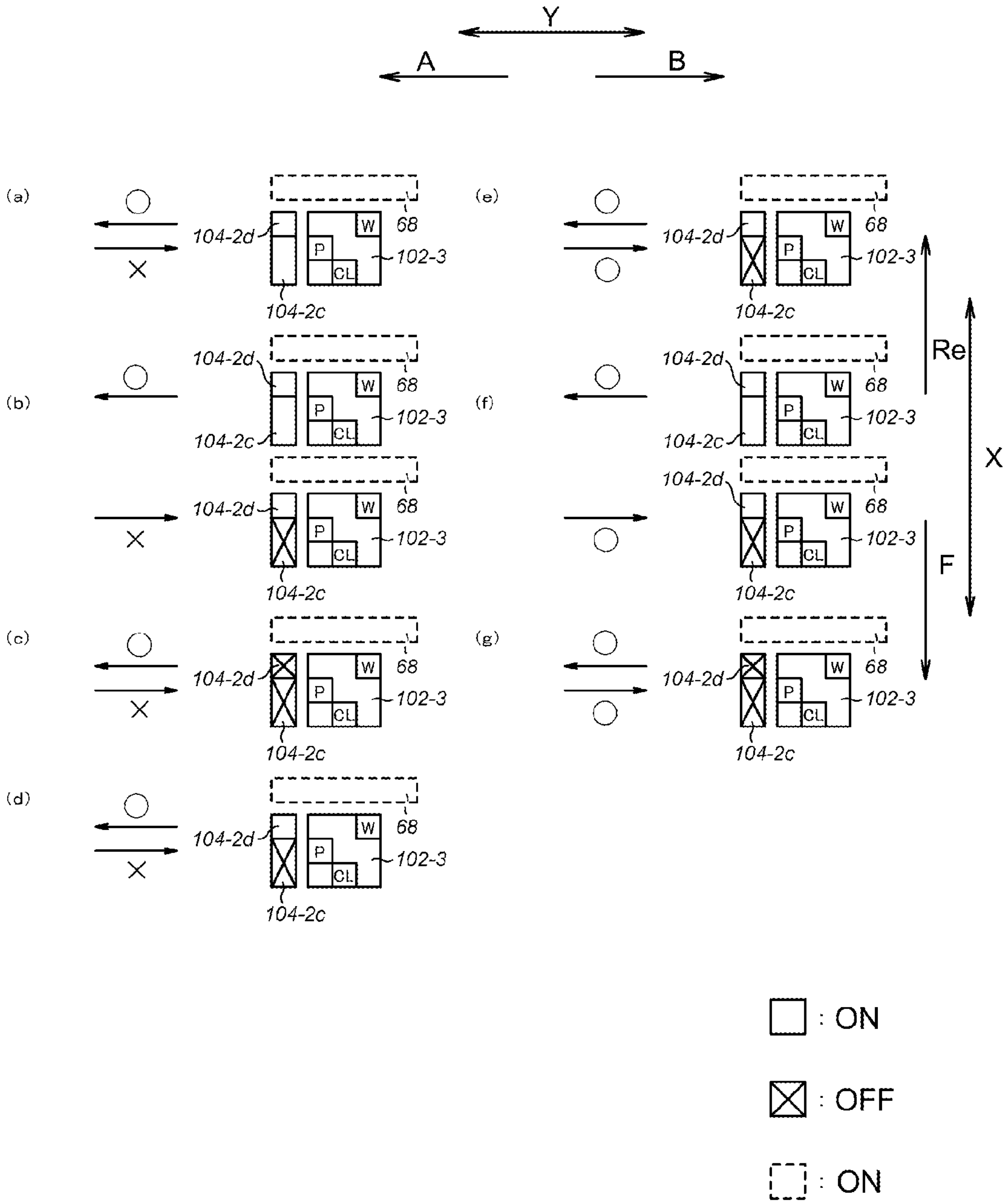
FIGS. 41(*a*) through (*g*) illustrate printing methods in Example 8 of Embodiment 4.

In Example 8, for the second printing, methods shown in, for example, FIGS. 41(*a*) through (*g*) may be used. The specifics of each method are clear from the figures, and will not be described.

(5) Embodiment 5

In the examples of Embodiments 1 through 4, the ink head unit ejects the process color ink and the white ink in the first printing, and ejects the clear ink in the second printing. However, the types of the ink ejected in the first printing and the second printing are not limited to those in the above examples.

For example, the ink head unit may eject the white ink in the first printing and may eject the process color ink in the second printing. In this case, the ink head unit does not need to include an ink head for ejecting the clear ink.

The ink head unit may eject the process color ink in the first printing and may eject the clear ink in the second printing.

Alternatively, the ink head unit may eject the white ink in the first printing and may eject the clear ink in the second printing.

The ink head unit may eject the process color ink in the first printing and may eject the white ink in the second printing. Alternatively, the ink head unit may eject the clear ink in the first printing and may eject the process color ink and the white ink in the second printing. For example, by performing the above-mentioned first printing and second printing on a transparent medium, a printed object recognizable through the transparent medium can be formed. In this case, the white color provided by the white ink is the background color of the printed object.

The ink head unit may eject the white ink in the first printing and may eject the white ink and the process color ink in the second printing. In this case, the white ink is ejected both while the recording paper is transferred forward and while the recording paper is transferred rearward. Therefore, a large amount of white ink can be ejected in a short time, and so a printed object having a sufficient concentration and thickness of the white ink can be formed.

(6) Embodiment 6

In Embodiments 1 through 5, the types of ink ejected in the first printing and the types of ink ejected in the second printing are partially or entirely different from each other. However, the types of ink ejected in the first printing and the types of ink ejected in the second printing may be the same. For example, the ink head unit may eject the process color ink in both of the first printing and the second printing. In this case, the process color ink is ejected both while the recording paper is transferred forward and while the recording paper is transferred rearward. Therefore, a large amount of process color ink can be ejected in a short time, and so a printed object having a sufficient concentration and thickness of the process color ink can be formed.

(7) Embodiment 7

Regarding the above embodiments, the first printing and the second printing may be the same as, or different from, each other in the mode of printing. Now, an embodiment in which the first printing and the second printing are different from each other in the mode of printing will be described.

The ink head unit may include an ink head for ejecting metallic ink of, for example, gold or silver. The metallic ink is less likely to be cured than the process color ink. Hence, in the case where the ink head unit ejects the process color ink in the first printing and ejects the metallic ink in the second printing, the moving rate of the carriage may be set to be lower in the second printing than in the first printing. Owing to this, the metallic ink can be irradiated with ultraviolet for a long time, and so the metallic ink, which is unlikely to be cured, can be cured with certainty.

When the process color ink is ejected, a plurality of colors of ink are ejected at the same time. Therefore, it is preferable to cure the process color ink quickly so that different colors of ink are not mixed. Hence, in the case where the ink head unit ejects the process color ink in the first printing and ejects single color ink, for example, the clear ink or the white ink in the second printing, the moving rate of the carriage may be set to be higher in the first printing than in the second printing. Owing to this, the process color ink can be cured immediately after being ejected, and so can be prevented from running on the recording paper.

By ejecting a large amount of clear ink toward the recording paper, a three-dimensional printed object with a swollen surface can be formed. However, in order to cure the large amount of clear ink with certainty, the clear ink needs to be irradiated with a larger amount of ultraviolet. Hence, in the case where the ink head unit ejects the process color ink in the first printing and ejects the clear ink in the second printing to perform three-dimensional printing, the moving rate of the carriage may be set to be lower in the second printing than in the first printing. Owing to this, the clear ink can be irradiated with ultraviolet for a long time and so can be cured with certainty.

In the case where the ink head unit ejects the process color ink in the first printing and ejects the clear ink in the second printing to perform three-dimensional printing, the transfer rate of the recording paper may be set to be lower in the second printing than in the first printing. Namely, the rate at which the recording paper is transferred rearward may be lower than the rate at which the recording paper is transferred forward. In this case also, the clear ink can be irradiated with ultraviolet for a long time and so can be cured with certainty.

In the case where the ink head unit ejects the process color ink in the first printing and ejects the clear ink in the second printing to perform three-dimensional printing, the number of paths of printing may be set to be larger in the second printing than in the first printing. Owing to this, a thicker clear ink layer can be formed on the recording paper. The number of paths of printing is the number of times the carriage needs to reciprocate in order to complete one line of printing. In the case where the number of paths of printing is 1, while the carriage reciprocates once, the medium is transferred by one line. In the case where the number of paths of printing is 4, while the carriage reciprocates once, the medium is transferred by ¼ line.

In the case where the ink head unit ejects the process color ink in the first printing and ejects single color ink in the second printing, the number of paths of printing may be set to be larger in the first printing than in the second printing.

In the case where the ink head unit ejects the process color ink in the first printing and ejects the clear ink in the second printing to provide a glossy finish, the resolution of printing may be set to be higher in the first printing than in the second printing.

In the case where the ink head unit ejects the white ink in the first printing and ejects the process color ink in the second printing, the size of ink dots formed on the recording paper may be set to be smaller in the second printing than in the first printing. Owing to this, the process color can be printed more clearly.

(8) Embodiment 8

Figure 42:
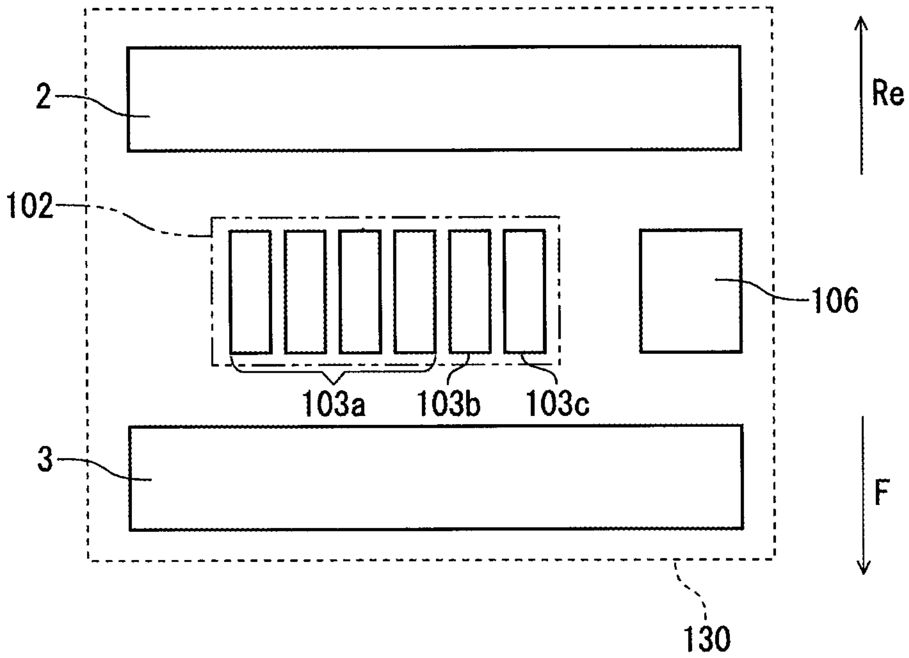
FIG. 42 shows an arrangement of an ink head unit and ultraviolet lamps in Embodiment 8.

In the above embodiments, no ultraviolet lamp is provided forward to the ink head unit. However, an ultraviolet lamp may be located forward to the ink head unit. For example, as shown in FIG. 42, ultraviolet lamps 106, 2 and 3 may be located to the side of, rearward to, and forward to, the ink head unit 102 respectively.

In the first printing, for example, the ultraviolet lamp 3 may be lit up and the ultraviolet lamp 106 may be lit out. Owing to this, even in the first printing, a relatively long time may be provided after the ink is ejected until the ink is cured. By curing the ink with the ultraviolet lamp 3, gloss printing with a higher degree of glossiness can be realized. In this embodiment, gloss printing with a higher degree of glossiness can be realized in both of the first printing and the second printing.

(9) Embodiment 9

Figure 43:
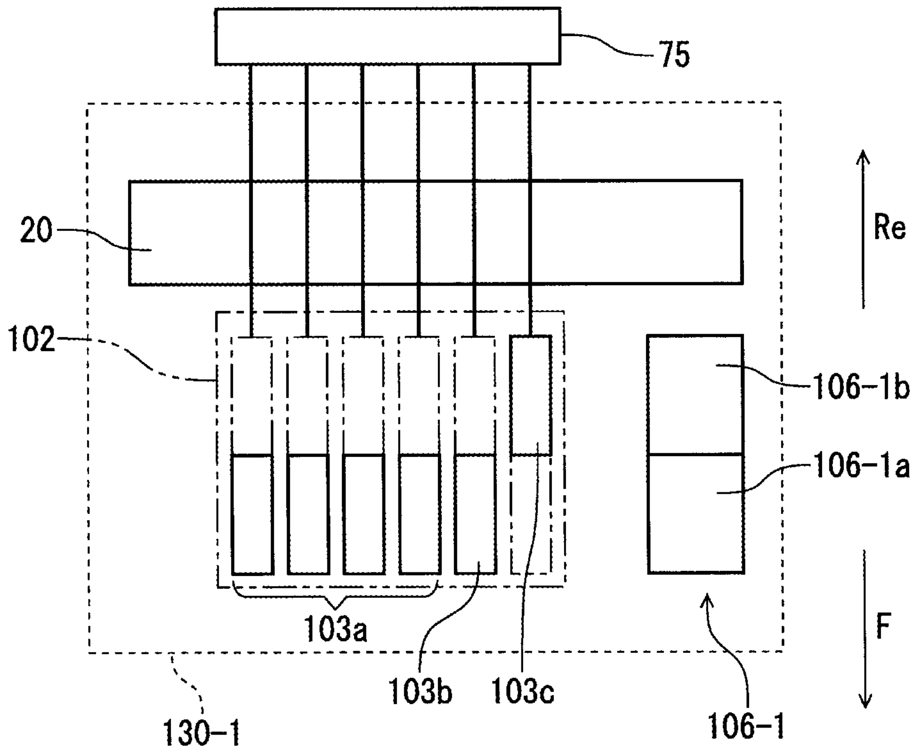
FIG. 43 shows an arrangement of an ink head unit and ultraviolet lamps in Embodiment 9.

Regarding the above embodiments, a position changing mechanism for changing the position of one or a plurality of ink heads in the forward-rearward direction may be provided. For example, as shown in FIG. 43, an ink head moving mechanism 75 for moving the process color ink head 103*a*, the clear ink head 103*b*, and the white ink head 103*c* in the forward-rearward direction may be provided. The ink head moving mechanism 75 is controlled by the control device 50 (not shown in FIG. 43; see FIG. 1). In FIG. 43, the process color ink head 103*a* and the clear ink head 103*b* are located at forward position, and the white ink head 103*c* is located at a rearward position. The position changing mechanism may be any device which can change the position of the ink heads automatically or manually, and is not limited to the ink head moving mechanism 75 which moves the ink heads using the power of a motor or the like.

Figure 44:
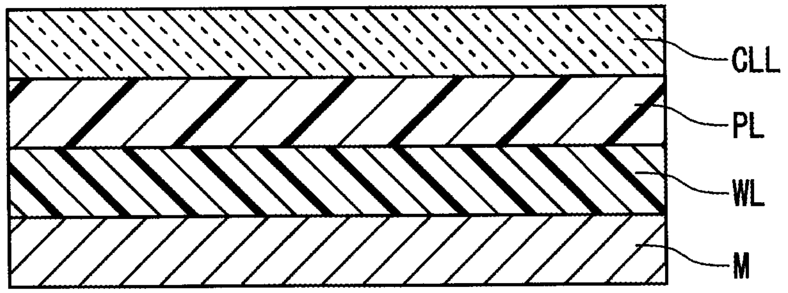
FIG. 44 is a cross-sectional view of a printed object.

In this embodiment also, the present invention can be carried out in various examples. For example, in the first printing, while the recording paper is sequentially transferred forward, the process color ink head 103*a* and the white ink head 103*c* eject the ink. The ultraviolet lamps 106-1*a* and 106-1*b* are lit up and the ultraviolet lamp 20 is lit out. In the second printing, while the recording paper is sequentially transferred rearward, the clear ink head 103*b* ejects the ink. The ultraviolet lamps 106-1*a* and 106-*b* are lit up and the ultraviolet lamp 20 is lit out. Owing to this, as shown in FIG. 44, a printed object including a white ink layer WL, a process color ink layer PL, and a clear ink layer CL stacked sequentially on the recording paper M can be obtained.

In this embodiment, the order of the ink layers can be changed in accordance with the type of the medium, the use of the printed object or the like. By changing the positions of the process color ink head 103*a*, the clear ink head 103*b* and the white ink head 103*c* in the forward-rearward direction, a wide variety of printed objects can be obtained.

(10) Other Embodiments

In the above embodiments, the UV ink and the irradiation device for outputting ultraviolet were used. Alternatively, an irradiation device for outputting light different from ultraviolet, for example, visible light, electron beams or the like may be used; and ink curable when being irradiated with the light from this irradiation device may be used. Instead of a device for outputting light, a device for thermally curing ink may be used.

According to the present invention, the device for curing the ink such as an irradiation device or the like is not absolutely necessary. Regarding the ink, instead of the UV ink, solvent-based ink, water-soluble ink or other types of ink may be used.

The inkjet printer 100 in each of the above embodiments transfers the recording paper located on a platen in the forward-rearward direction by rollers. However, the inkjet printer according to the present invention may include a bed for supporting the recording paper and a mechanism for moving the bed in the forward-rearward direction.

In the above embodiments, the ultraviolet lamp located forward or rearward to the ink head (e.g., the ultraviolet lamp 2 in FIG. 2, etc.) may be located outside the carriage with no need to move together with the carriage. For example, the ultraviolet lamp may be fixed to the base member 112 (see FIG. 1).

In the above embodiments, the printing is performed, first while the medium is sequentially transferred forward, and then while the medium is sequentially transferred rearward. Alternatively, the printing may be performed, first while the medium is sequentially transferred rearward, and then while the medium is sequentially transferred forward. Namely, the first printing may be performed after the second printing.

<Effects of the Embodiments>

As described above, according to the above embodiments, the control device 50 performs the first printing of causing the ink head unit to eject the ink while sequentially transferring the medium forward and the second printing of causing the ink head unit to eject the ink while sequentially transferring the medium rearward. The inkjet printer in each of the above embodiments performs printing even while returning the medium rearward, and so the printing time can be shortened.

In the case where different types of ink are ejected in the first printing from in the second printing, a printed object including a stack of layers of different types of ink can be obtained in a short time.

In the case where at least one of the ink heads is located forward or rearward to the other ink heads (see, for example, FIG. 6, etc.), while the medium is sequentially transferred in one direction, forward or rearward, ink ejected from the at least one of the ink heads can be put on the ink ejected from the other ink heads. Therefore, even while the medium is sequentially transferred in one direction, a plurality of ink layers can be formed on the medium. As a result, the printing time can be shortened.

In the case where, as shown in FIG. 43, a position changing mechanism for changing the position of the ink heads in the forward-rearward direction is provided, a wide variety of printed objects can be obtained.

In the case where the mode of printing is changed between the first printing and the second printing, a wide variety of printed objects can be obtained.

By use of ink curable when being irradiated with light, an ink layer can be formed instantaneously by outputting light from the irradiation device. Therefore, different types of ink in a plurality of ink layers can be prevented from mixing. Thus, a high quality printed object can be obtained. By controlling the timing of turning on or off the irradiation device, a plurality of types of printing with different surface states, for example, gloss printing and matte printing can be realized.

In the case where an irradiating body is provided rearward to the ink head unit (e.g., the ultraviolet lamp 2 in FIG. 2), a relatively long time can be provided after the ink is ejected until the ink is cured in the second printing. Therefore, gloss printing with a higher degree of glossiness can be realized in the second printing.

In the case where an irradiating body movable in the left-right direction together with the ink head unit (e.g., the ultraviolet lamp 106 in FIG. 2) is provided and the pattern of lighting up the irradiating body is changed between the first printing and the second printing, a wide variety of printed objects can be obtained.

REFERENCE SIGNS LIST

2 Ultraviolet lamp (irradiation device)
50 Control device
55 Grid roller (transfer mechanism)
100 Ink jet printer
102 Ink head unit

106 Ultraviolet lamp (irradiation device)
130 Carriage (moving mechanism)
F Forward
Re Rearward
M Recording paper (medium)

The invention claimed is:

1. An inkjet printer, comprising:

an ink head unit for ejecting ink toward a medium;

a moving mechanism for moving the ink head unit in a left-right direction;

a transfer mechanism for transferring the medium in a forward-rearward direction; and a control device for controlling the ink head unit, the moving mechanism, and the transfer mechanism, wherein the ink head unit includes a first ink head for ejecting process color ink, an additional first ink head for ejecting additional process color ink, and a second ink head for ejecting transparent ink, the additional first ink head is located leftward or rightward to the first ink head;

the second ink head is located forward or rearward to the first ink head;

the control device performs first printing of causing the first ink head and the additional first ink head to eject the process color ink and the additional process color ink, respectively, while sequentially transferring the medium forward and second printing of causing the second ink head to eject the transparent ink while sequentially transferring the medium rearward after the first printing, and the first ink head and the additional first ink head do not eject the process color ink and the additional processor color ink, respectively, during the second printing so that only the transparent ink is ejected by the ink head unit to the medium during the second printing.

2. An inkjet printer according to claim 1, further comprising a position changing mechanism for changing a position of at least one of the first ink head and the second ink head in the forward-rearward direction.

3. An inkjet printer according to claim 1, wherein the first printing and the second printing are different from each other in the mode of printing.

4. An inkjet printer according to claim 3, wherein the first printing and the second printing are different from each other in the moving rate of the ink head unit.

5. An inkjet printer according to claim 3, wherein the first printing and the second printing are different from each other in the number of paths of printing.

6. An inkjet printer according to claim 3, wherein the first printing and the second printing are different from each other in the resolution of printing.

7. An inkjet printer according to claim 3, wherein the first printing and the second printing are different from each other in the size of ink dots formed on the medium by the ink landing on the medium.

8. An inkjet printer according to claim 1, wherein:

the ink is curable when being irradiated with light; and the inkjet printer includes an irradiation device for irradiating the ink on the medium with light.

9. An inkjet printer according to claim 8, wherein the irradiation device includes an irradiating body located rearward to the ink head unit.

10. An inkjet printer according to claim 9, wherein the control device lights up the irradiating body in the second printing.

11. An inkjet printer according to claim 8, wherein:

the irradiation device includes an irradiating body movable in the left-right direction together with the ink head unit; and the first printing and the second printing are different from each other in pattern of lighting up the irradiating body.

* * * * *